(12) United States Patent
Robins et al.

(10) Patent No.: US 10,688,711 B2
(45) Date of Patent: Jun. 23, 2020

(54) HEAT BLANKET ASSEMBLY FOR FORMING A COMPOSITE CHARGE

(71) Applicants: The Boeing Company, Chicago, IL (US); Applus Servicios Tecnologicos, Barcelona (ES)

(72) Inventors: Brian G. Robins, Renton, WA (US); Ivan Berrios, Bothel, WA (US); Jordi Brufau Redondo, Barcelona (ES); Maria Clemencia Corzo Rueda, Barcelona (ES)

(73) Assignees: The Boeing Company, Chicago, IL (US); Applus Servicios Tecnologicos, Barcelona (ES)

( * ) Notice: Subject to any disclaimer, the term of this patent is extended or adjusted under 35 U.S.C. 154(b) by 328 days.

(21) Appl. No.: 15/649,644

(22) Filed: Jul. 14, 2017

(65) Prior Publication Data

US 2019/0016040 A1   Jan. 17, 2019

(51) Int. Cl.
*B29C 70/50* (2006.01)
*B29C 51/42* (2006.01)
(Continued)

(52) U.S. Cl.
CPC .............. *B29C 51/42* (2013.01); *B29C 43/02* (2013.01); *B29C 51/12* (2013.01); *B29C 53/02* (2013.01);
(Continued)

(58) Field of Classification Search
CPC ....... B29C 51/42; B29C 53/02; B29C 53/043; B29C 70/30
See application file for complete search history.

(56) References Cited

U.S. PATENT DOCUMENTS 2,968,064 A   1/1961   Howell
3,102,186 A * 8/1963   Owers ................... H05B 3/342
                                              219/212
(Continued)

FOREIGN PATENT DOCUMENTS

DE   102012019958   4/2013
EP   2995443        3/2016
(Continued)

OTHER PUBLICATIONS

EPO, European Search Report for Appl. No. 18183405.2 dated Jan. 4, 2019.
(Continued)

*Primary Examiner* — Galen H Hauth

(57) ABSTRACT

A blanket assembly for forming a composite charge onto a forming mandrel includes upper and lower heating blankets configured to have a composite charge slidable therebetween during translation along the forming mandrel. The blanket assembly has a pair of wedge elements with tapered sections that are each positionable between the lower heating blanket and the mandrel side surfaces. The wedge element top sides are inclined from the tapered section forward end to the tapered section aft end. The upper heating blanket exerts a blanket forming pressure for progressively forming the composite charge into the cross-sectional shape of the forming mandrel collectively defined by the mandrel side surfaces and wedge element top sides as the composite charge passes over the tapered sections of the blanket assembly. The wedge element top sides maintain the laterally outboard portions of the composite charge in approximately parallel relation to a level tangent to the mandrel top portion.

23 Claims, 19 Drawing Sheets

(51) Int. Cl.
  *B29C 51/12*  (2006.01)
  *B29C 70/30*  (2006.01)
  *B29C 53/02*  (2006.01)
  *B29D 99/00*  (2010.01)
  *B29C 43/02*  (2006.01)
  *B29C 53/04*  (2006.01)
  *B29L 31/00*  (2006.01)
  *B29L 31/30*  (2006.01)

(52) U.S. Cl.
  CPC ............ *B29C 53/043* (2013.01); *B29C 70/30* (2013.01); *B29D 99/0003* (2013.01); *B29L 2031/003* (2013.01); *B29L 2031/3085* (2013.01)

(56) References Cited

U.S. PATENT DOCUMENTS

| | | | |
|---|---|---|---|
| 3,655,320 A | 4/1972 | Heavener | |
| 5,167,742 A | 12/1992 | Peters | |
| 5,648,109 A | 7/1997 | Gutowski | |
| 2009/0130450 A1* | 5/2009 | Anderson | ............... B29C 70/38 428/411.1 |
| 2012/0256348 A1 | 10/2012 | Bergmann | |
| 2014/0131914 A1* | 5/2014 | Gottinger | ............... B29B 11/16 264/163 |
| 2014/0190625 A1 | 7/2014 | Buttrick | |
| 2014/0290866 A1 | 10/2014 | Brufau Redondo | |
| 2014/0314996 A1 | 10/2014 | Stewart | |
| 2015/0151507 A1 | 6/2015 | Edelmann | |
| 2016/0082675 A1* | 3/2016 | Brufau Redondo | .. B29C 70/386 156/459 |
| 2017/0021534 A1 | 2/2017 | Chapman et al. | |

FOREIGN PATENT DOCUMENTS

| | | |
|---|---|---|
| EP | 3015258 | 4/2016 |
| WO | WO2004000656 | 3/2003 |
| WO | WO2014181003 | 11/2014 |

OTHER PUBLICATIONS

Dykes: "Roll forming continuous fibre-reinforced thermoplastic sheets: experimental analysis," Composites Part A: Applied Science and Manufacturing, Elsevier, Amsterdam, NL, vol. 31, No. 12, Dec. 1, 2000 (Dec. 1, 2000), pp. 1395-1407.

EPO, European Search Report for Appl. No. 181834425 dated Dec. 19, 2018.

* cited by examiner

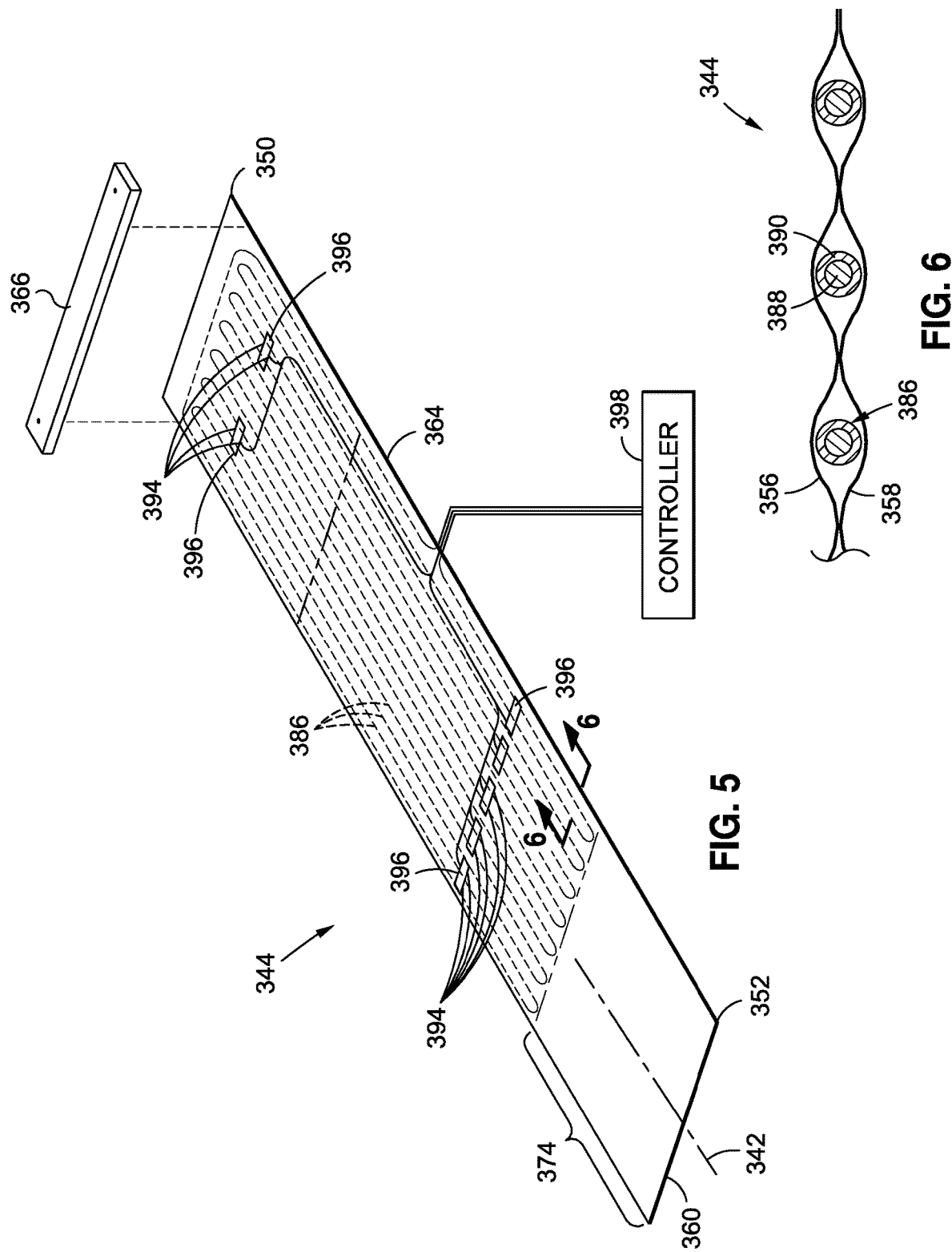

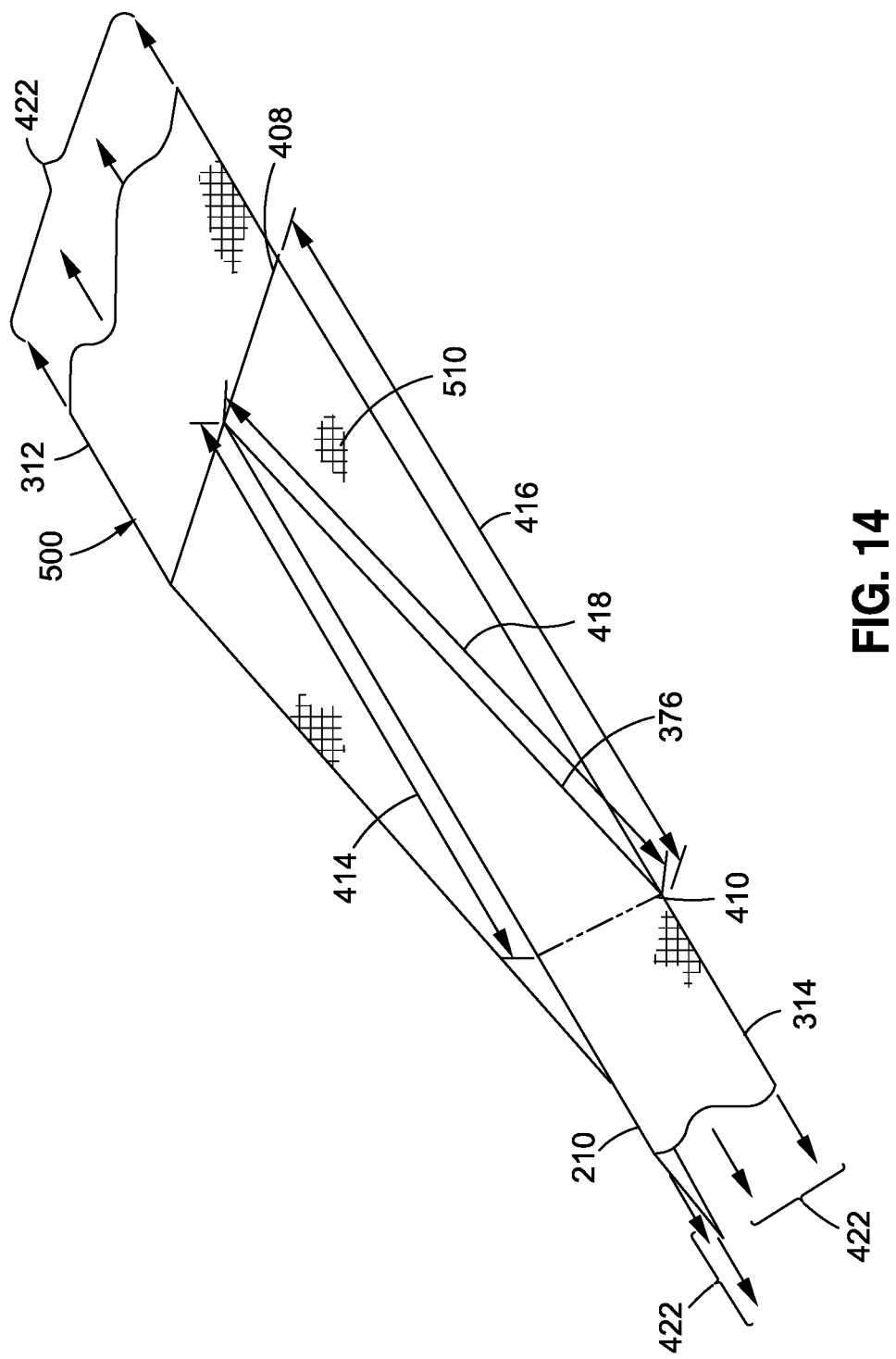

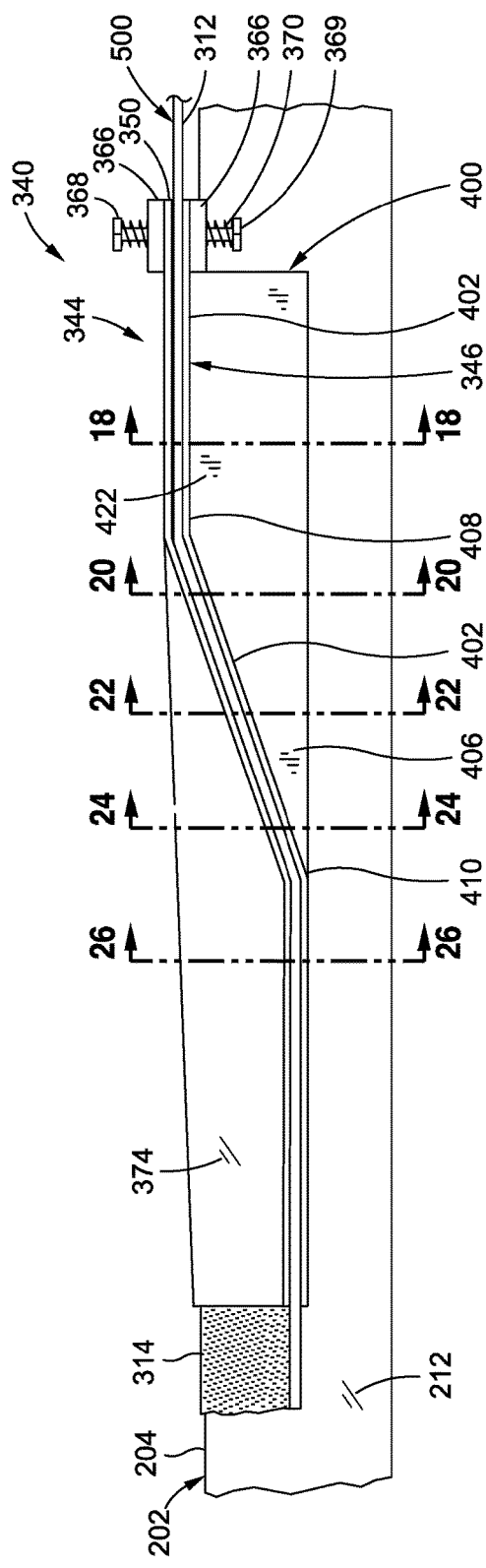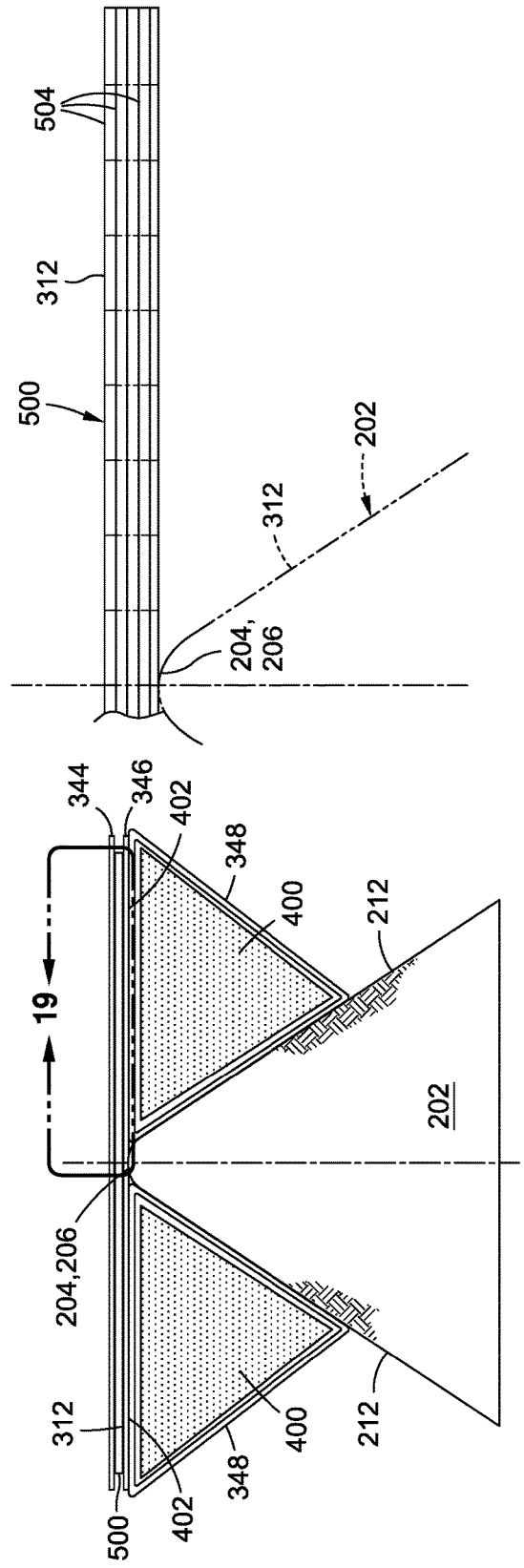
FIG. 17
FIG. 18
FIG. 19

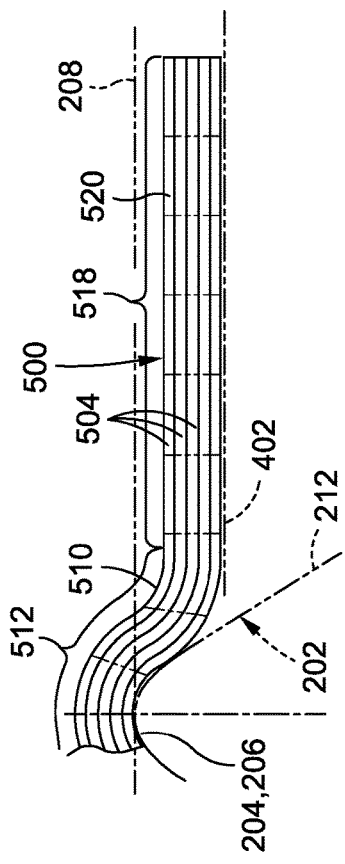
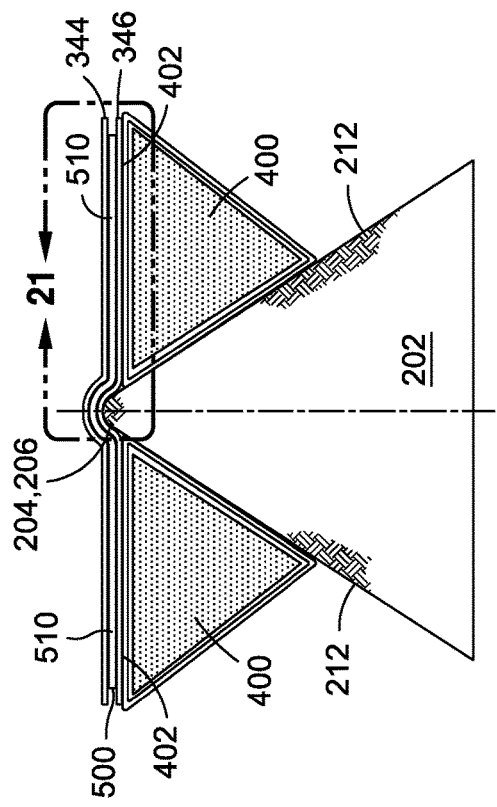
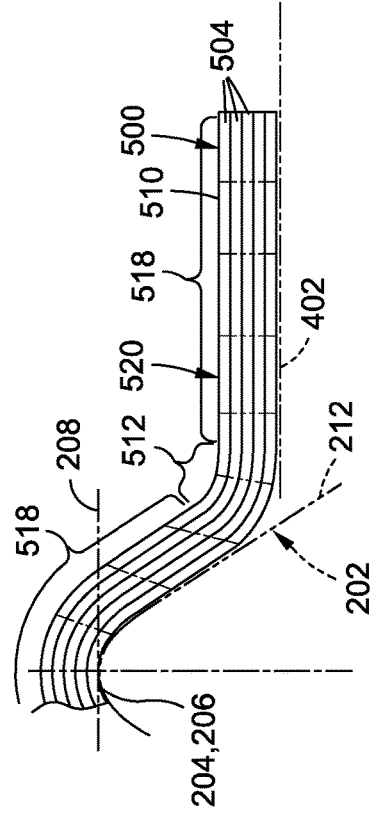
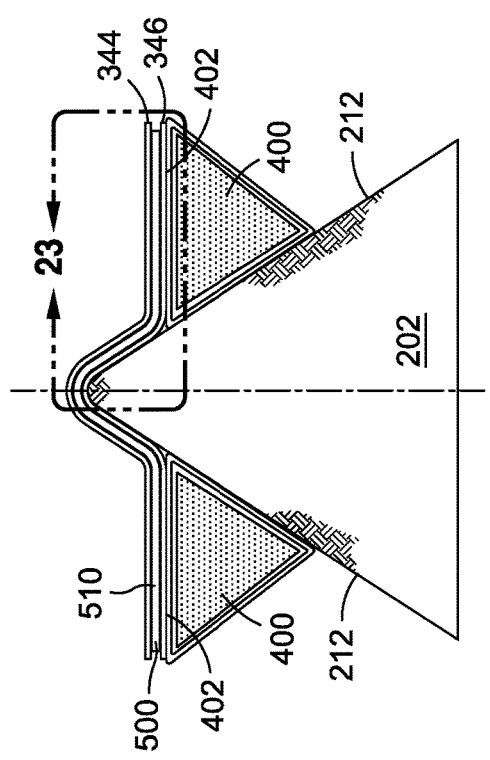

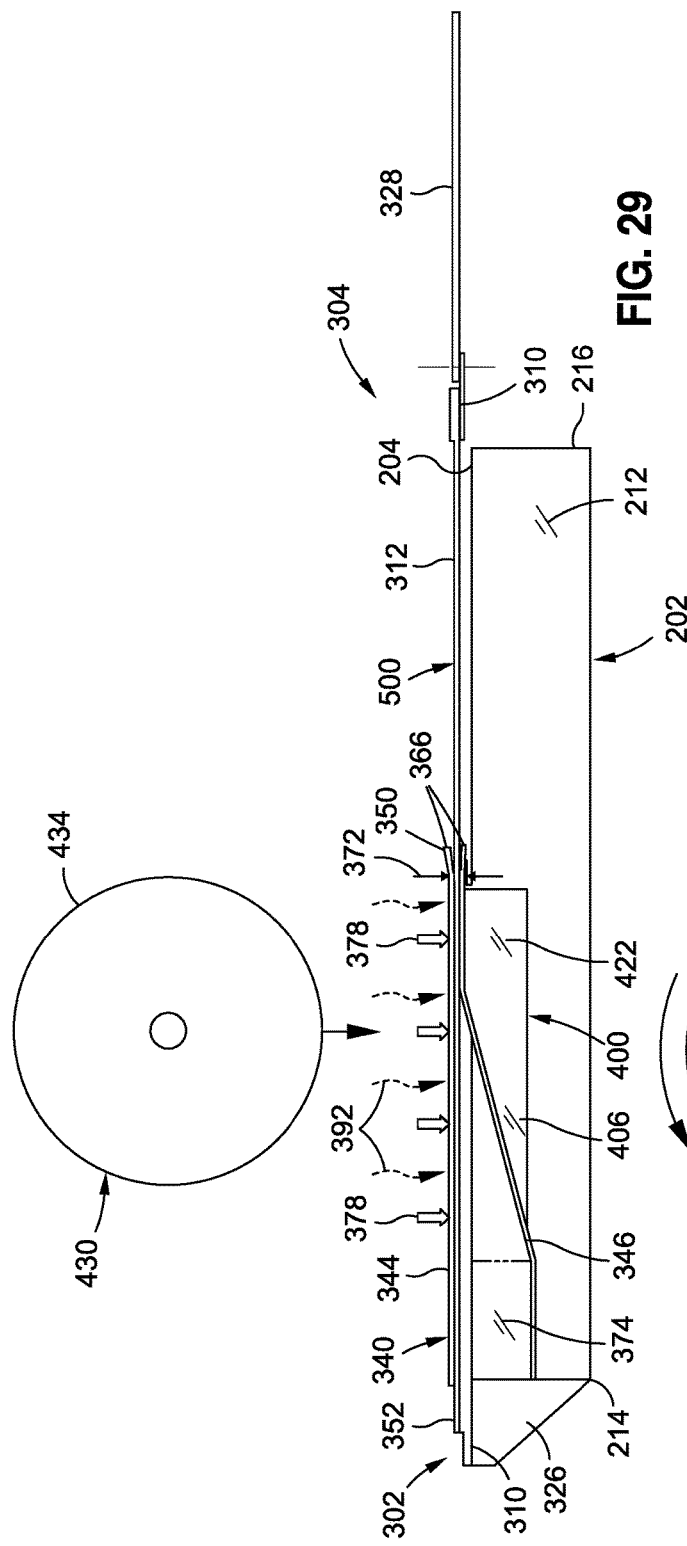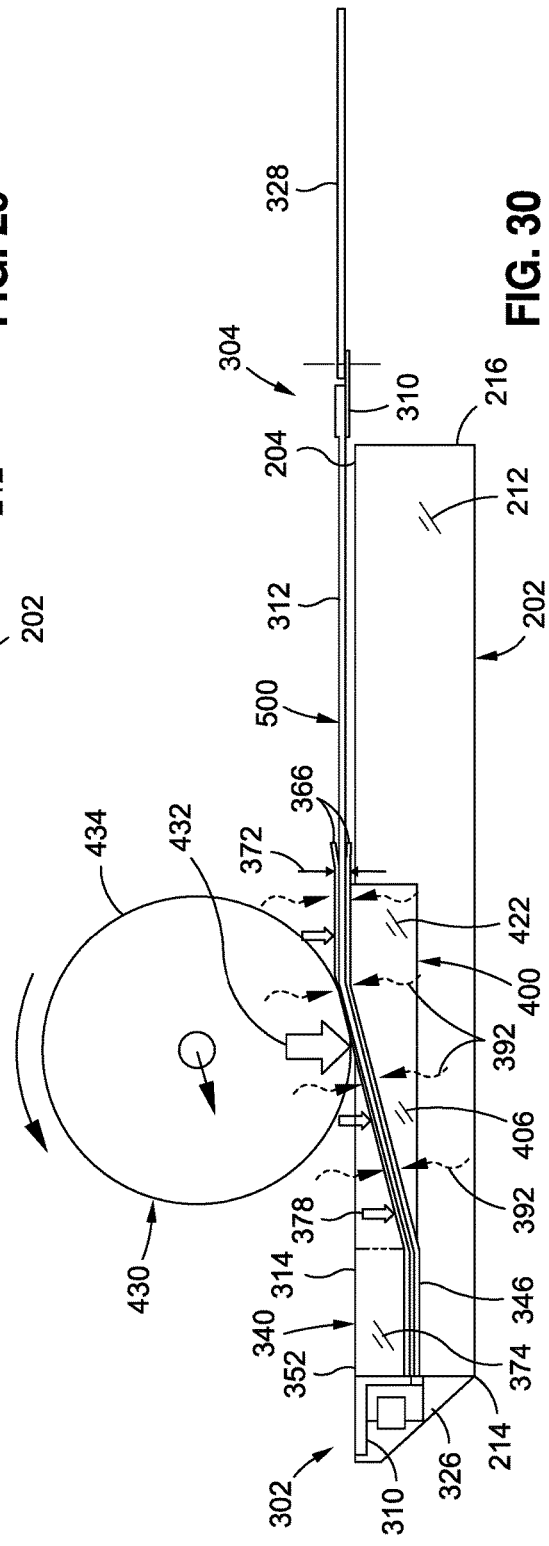

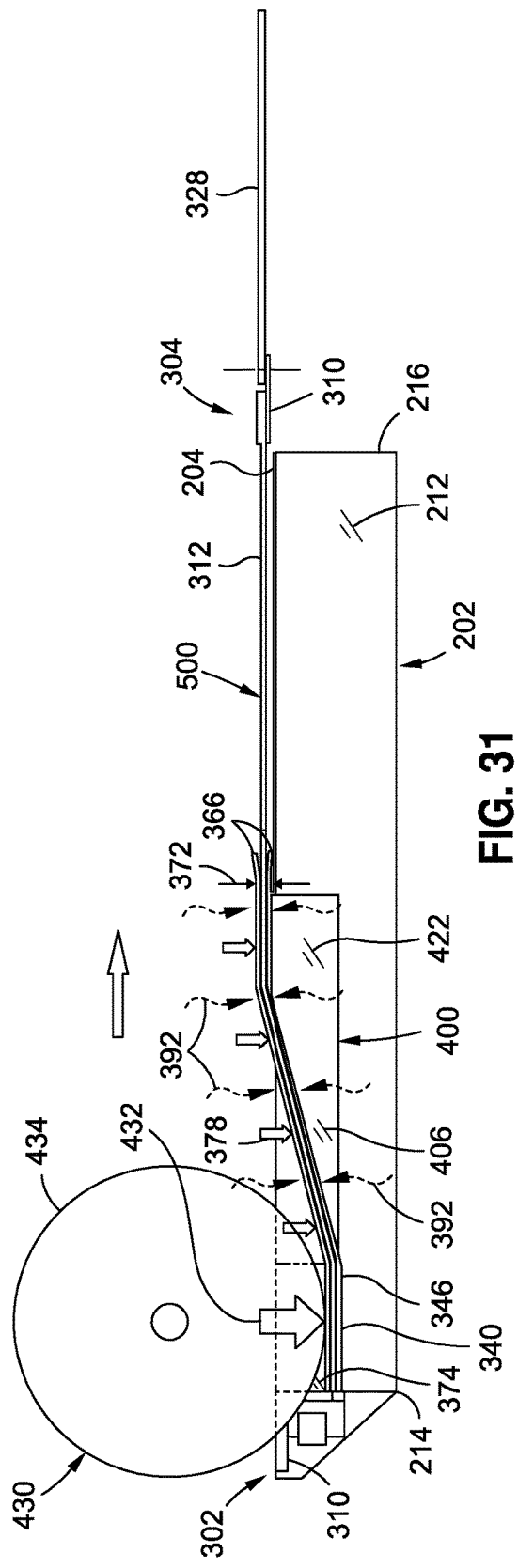
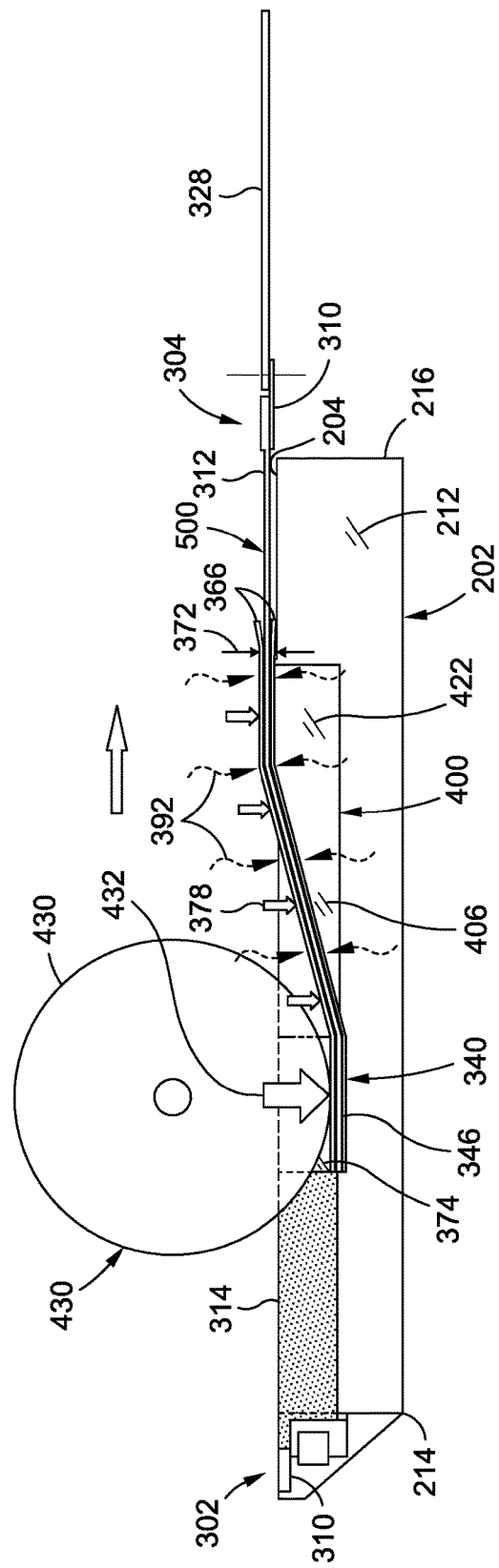
FIG. 31
FIG. 32

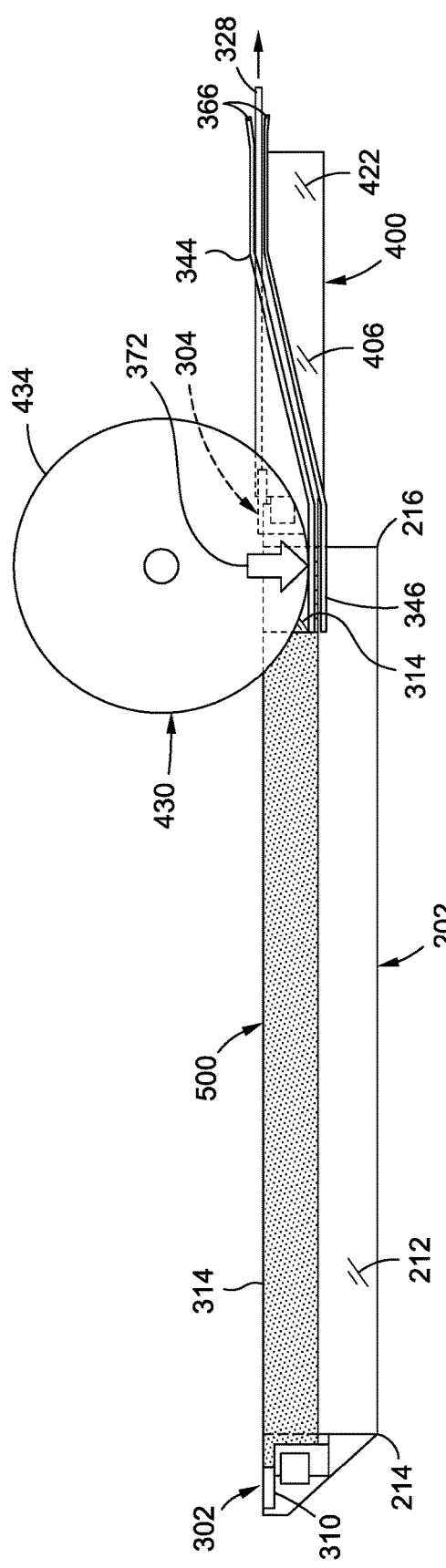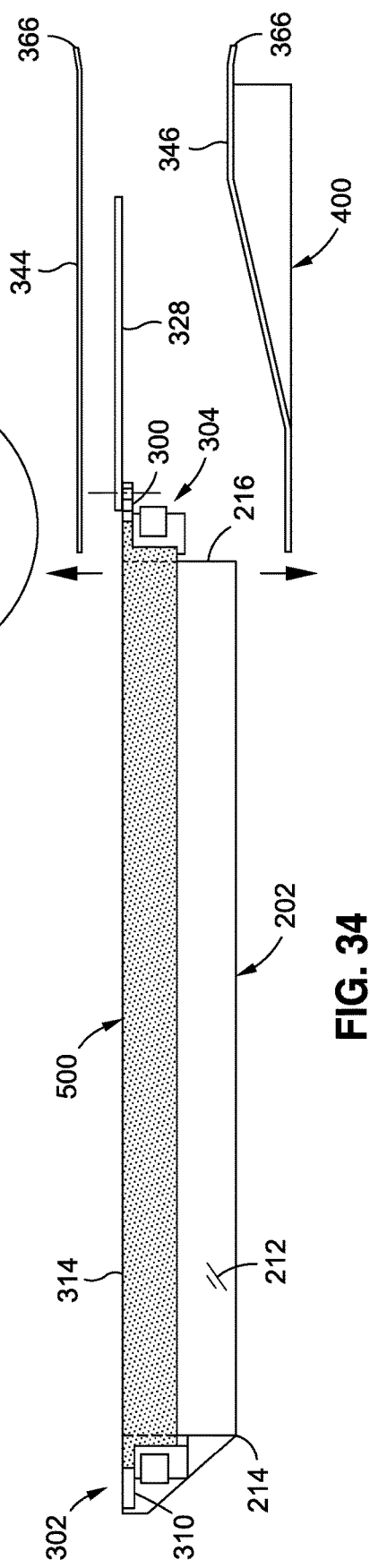

HEAT BLANKET ASSEMBLY FOR FORMING A COMPOSITE CHARGE

FIELD

The present disclosure relates generally to composites manufacturing and, more particularly, to a heat blanket assembly for forming a composite charge onto a forming mandrel.

BACKGROUND

Composite structures are used in a wide variety of applications due to their high strength-to-weight ratio, improved corrosion resistance, and other favorable properties. In aircraft construction, composites are used in increasing quantities to form the fuselage, wings, and other components. For example, a wing panel may be produced by co-curing or co-bonding a plurality of elongated composite stringers to a composite wing skin. The process of fabricating each composite stringer may include forming a stack or charge of uncured composite plies over an elongated forming mandrel so that the composite charge assumes the shape of the forming mandrel, after which the composite charge is cured. Each composite ply may be comprised of reinforcing fibers (e.g., carbon fibers) impregnated with polymer matrix material (e.g., epoxy resin).

Conventional methods of forming an uncured composite charge over a forming mandrel may result in the occurrence of wrinkling or buckling of the reinforcing fibers. Such wrinkles may occur in the innermost composite plies at locations along inside corners formed in the composite charge. Localized wrinkling or buckling along inside corners of the composite charge may occur as a result of the buildup of compressive forces in the composite plies located nearest the forming mandrel. The buildup of compressive forces is due to the inability of adjacent composite plies to slip relative to one another as the composite charge is conformed to the cross-sectional shape of the forming mandrel. Wrinkles may also occur in any one or more of the composite plies of a partially-cured composite charge when formed into a contour that results in some areas of the composite charge being put into a compressive state. Areas of wrinkling in a composite structure may represent locally bent or kinked reinforcing fibers, and which reduces the strength and/or stiffness of the cured composite structure.

As can be seen, there exists a need in the art for a system and method for forming a composite charge over a forming mandrel without the occurrence of localized wrinkling or buckling of composite plies.

SUMMARY

The above-noted needs associated with forming a composite charge over a forming mandrel are specifically addressed and alleviated by the present disclosure which provides a blanket assembly for forming a composite charge onto a forming mandrel such as by using a method known as general in-tension discrete extrusion (GLIDE) forming, referred to herein as glide forming. The forming mandrel has opposing mandrel side surfaces interconnected by a mandrel top portion. The blanket assembly includes an upper heating blanket and a lower heating blanket configured to have a composite charge slidable therebetween during translation of the upper heating blanket and the lower heating blanket along a lengthwise direction of a forming mandrel. The blanket assembly further includes a heating element included with at least one of the upper heating blanket and the lower heating blanket for heating the composite charge. The blanket assembly also includes a pair of wedge elements positionable against an underside of the lower heating blanket. Each one of the wedge elements includes a tapered section and has a wedge element inner side configured to bear against one of the opposing mandrel side surfaces.

In the blanket assembly, each one of the wedge elements has a wedge element top side configured to support the composite charge and the blanket assembly when mounted on the forming mandrel. Within the tapered sections, the wedge element top sides are downwardly inclined along a direction from the tapered section forward end to the tapered section aft end. The upper heating blanket is configured to exert a blanket forming pressure onto the composite charge for urging the composite charge and lower heating blanket toward the mandrel side surfaces and wedge element top sides as a means to progressively forming the composite charge and lower heating blanket against the mandrel side surfaces and wedge element top sides during translation of the blanket assembly along the forming mandrel. The blanket forming pressure induces in laterally opposite sides of the composite charge a Z-shaped contour having a laterally-outwardly-moving slipping zone located along a juncture of each mandrel side surface with a wedge element top side. Within the slipping zones, the composite plies of the composite charge interlaminarly slip relative to one another due to reduced interlaminar friction facilitated by reduced resin viscosity in the composite charge due to heat from the heating element. As the blanket assembly is translated along the forming mandrel, the wedge element top sides are each configured to maintain the laterally outboard portion of the Z-shaped contour on each side of the composite charge in approximately parallel relation to a level tangent to the mandrel top portion as a means to reduce or prevent the occurrence of wrinkles at locations along inside corners formed in the composite charge.

Also disclosed is a forming system for glide forming a composite charge onto a forming mandrel. The forming system includes a forming mandrel having a mandrel upstream end, a mandrel downstream end, and opposing mandrel side surfaces interconnected by a mandrel top portion, as described above. In addition, the forming system includes the above-described blanket assembly for progressively forming the composite charge from an initially approximately flat configuration to a folded configuration corresponding to the cross-sectional shape of the forming mandrel during translation of the blanket assembly along the forming mandrel.

Additionally, disclosed is method of forming a composite charge onto a forming mandrel. The method includes positioning a composite charge between an upper heating blanket and a lower heating blanket mounted on a forming mandrel having opposing mandrel side surfaces interconnected by a mandrel top portion. As indicated above, the lower heating blanket has a pair of wedge elements respectively located between the opposing mandrel sides and an underside of the lower heating blanket. Each one of the wedge elements includes a tapered section having wedge element top sides that are downwardly inclined relative to the mandrel top portion from the forward end to the aft end of the tapered section. The upper heating blanket, the lower heating blanket, and the wedge elements collectively form a blanket assembly. The method additionally includes heating the composite charge using the upper heating blanket and/or the lower heating blanket to reduce the viscosity of the resin in the composite charge to reduce the interlaminar friction between composite plies, and translating the blanket assembly along a lengthwise direction of the forming mandrel with the composite charge sliding therebetween.

During translation of the blanket assembly, the method includes exerting, using the upper heating blanket, a blanket forming pressure on the composite charge passing over the tapered sections, and urging the composite charge and lower heating blanket toward the mandrel side surfaces and wedge element top sides for progressively forming the composite charge against the mandrel side surfaces and wedge element top sides. The method includes inducing in each of laterally opposite sides of the composite charge a Z-shaped contour having a laterally-outwardly-moving slipping zone located along a juncture of each mandrel side surface with a wedge element top side, and within which composite plies of the composite charge interlaminarly slip relative to one another due to reduced interlaminar friction between the composite plies as a result of reduced resin viscosity due to heating of the composite charge by the blanket assembly. The method further includes supporting a laterally outboard portion of the Z-shaped contour on each laterally opposite side of the composite charge in approximately parallel relation to a level tangent to the mandrel top portion during forming of the composite charge against the mandrel side surfaces and wedge element top sides as a means to reduce or prevent the occurrence of wrinkles.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 5 is a perspective view of an example of an upper heating blanket of the heat blanket assembly taken along line 5 of FIG. 4 and illustrating a heating element;

FIG. 6 is a sectional view of a portion of the upper heating blanket taken along line 6 of FIG. 5 and illustrating the heating element comprised of an electrically-resistive wire encapsulated by an electrically-insulative sleeve;

FIG. 14 is a perspective illustration of a lengthwise section of the composite charge spanning across the tapered section of the wedge elements, and further illustrating lengthwise tension applied to the composite charge to minimize or prevent wrinkling in the composite charge along the diagonal notch on opposite sides of the forming mandrel in the area of a tapered section of the wedge elements;

FIG. 17 is a side view of a portion of the forming system showing the blanket assembly and the composite charge mounted on the forming mandrel;

FIG. 18 is a sectional view of the forming system taken along line 18 of FIG. 17 and illustrating an approximately flat configuration of the blanket assembly and composite charge supported by a forward section of the wedge elements;

FIG. 19 is a magnified sectional view of the composite charge taken along line 19 of FIG. 18 and illustrating an initially approximately flat configuration of the composite charge;

FIG. 20 is a sectional view of the forming system taken along line 20 of FIG. 17 and illustrating a Z-shaped contour induced in each of laterally opposite sides of the composite charge due to application of a blanket forming pressure applied by the upper heating blanket;

FIG. 21 is a magnified sectional view of the composite charge taken along line 21 of FIG. 20 and illustrating a laterally-outwardly-moving slipping zone located along a juncture of the mandrel side surface with the wedge element top side, and within which composite plies of the composite charge interlaminarly slip relative to one another during translation of the blanket assembly along the forming mandrel, and wherein the wedge elements maintain the laterally outboard portions of the composite charge in parallel relation (e.g., horizontal) to a level tangent to the mandrel top portion;

FIG. 22 is a sectional view of the forming system taken along line 22 of FIG. 17 and illustrating a further pronounced Z-shaped contour in each side of the composite charge as the composite charge moves over the tapered section of the wedge elements during translation of the blanket assembly along the forming mandrel;

FIG. 23 is a magnified sectional view of the composite charge taken along line 23 of FIG. 22 and illustrating the relatively small laterally-outwardly-moving slipping zone located at the juncture of the mandrel side surface with the wedge element top side, and further illustrating the non-slipping zones on opposite sides of the slipping zone and the laterally outboard portion of the composite charge maintained in a horizontal orientation by the wedge elements;

FIG. 29 is a side view of the forming system showing the blanket assembly and composite charge mounted on the forming mandrel and prior to the application of a forming device onto the blanket assembly;

FIG. 30 is a side view of the forming system showing the forming device applied onto the blanket assembly at a forward end of the tapered section for initial progressive conforming of the composite charge to the mandrel side surfaces and the wedge elements;

FIG. 31 is a side view of the forming system showing the forming device stationary on the blanket aft extension;

FIG. 32 is a side view of the forming system showing the blanket assembly and forming device being translated as a unit toward the mandrel upstream end, resulting in progressive forming of the composite charge to the cross-sectional shape of the forming mandrel;

FIG. 33 is a side view of the forming system showing the blanket assembly and forming device at the mandrel downstream end;

FIG. 34 is a side view of the forming system showing the removal of the blanket assembly and forming device from the forming mandrel and illustrating the composite charge conformed to the cross-sectional shape of the forming mandrel.

DETAILED DESCRIPTION

Figure 1:
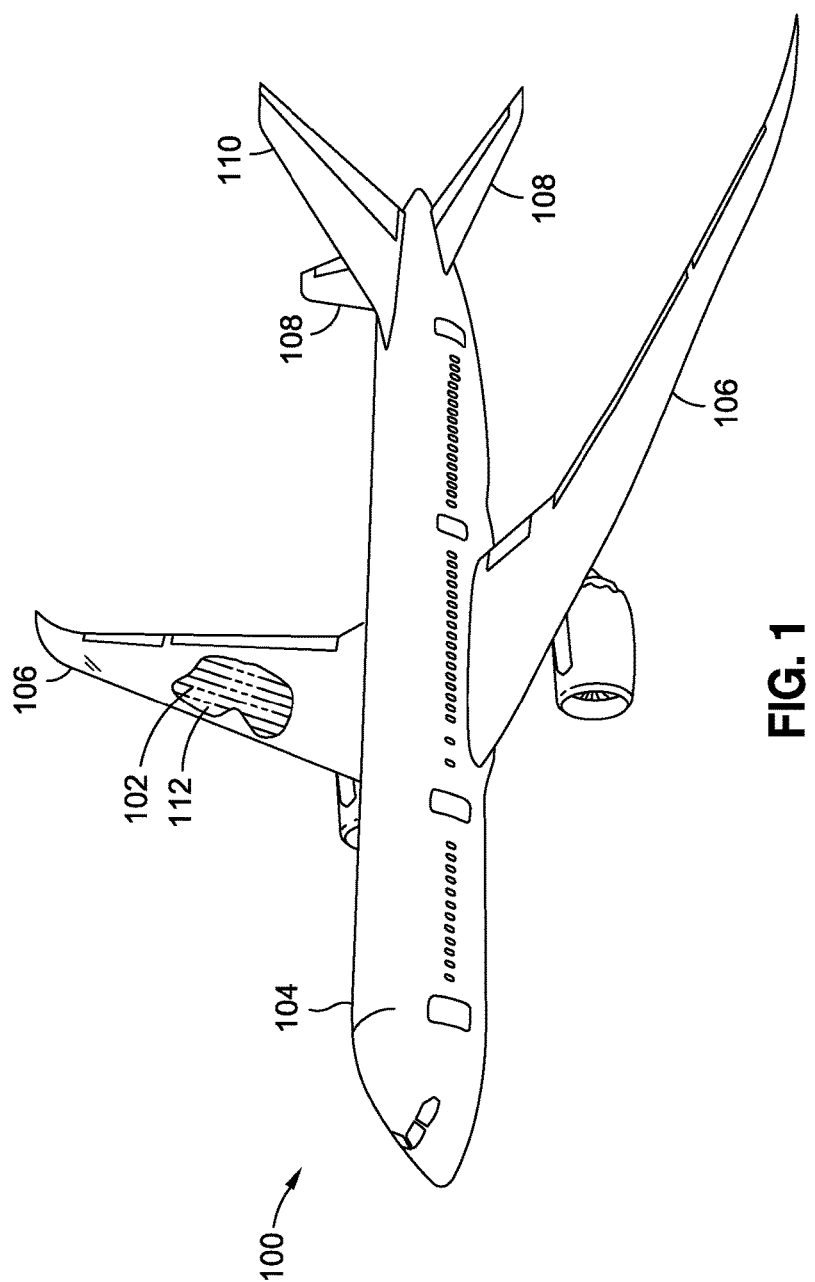
FIG. 1 is a perspective view of an aircraft having composite wings each comprising a composite wing panel stiffened by a plurality of composite stringers.
Figure 2:
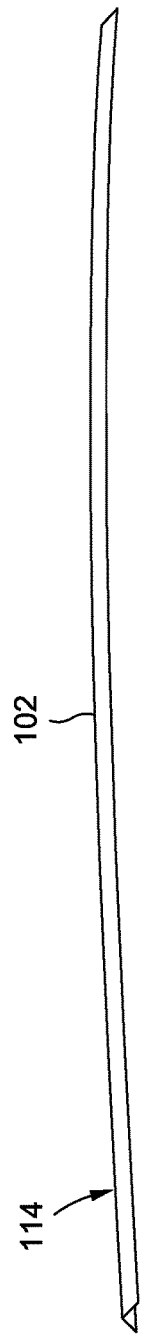
FIG. 2 is a perspective view of an example of an L-shaped stringer, two of which may be assembled in back-to-back relation to form a T-shaped composite stringer, and wherein each L-shaped stringer may be formed on a forming mandrel using the heat blanket assembly and method disclosed herein.
Figure 28:
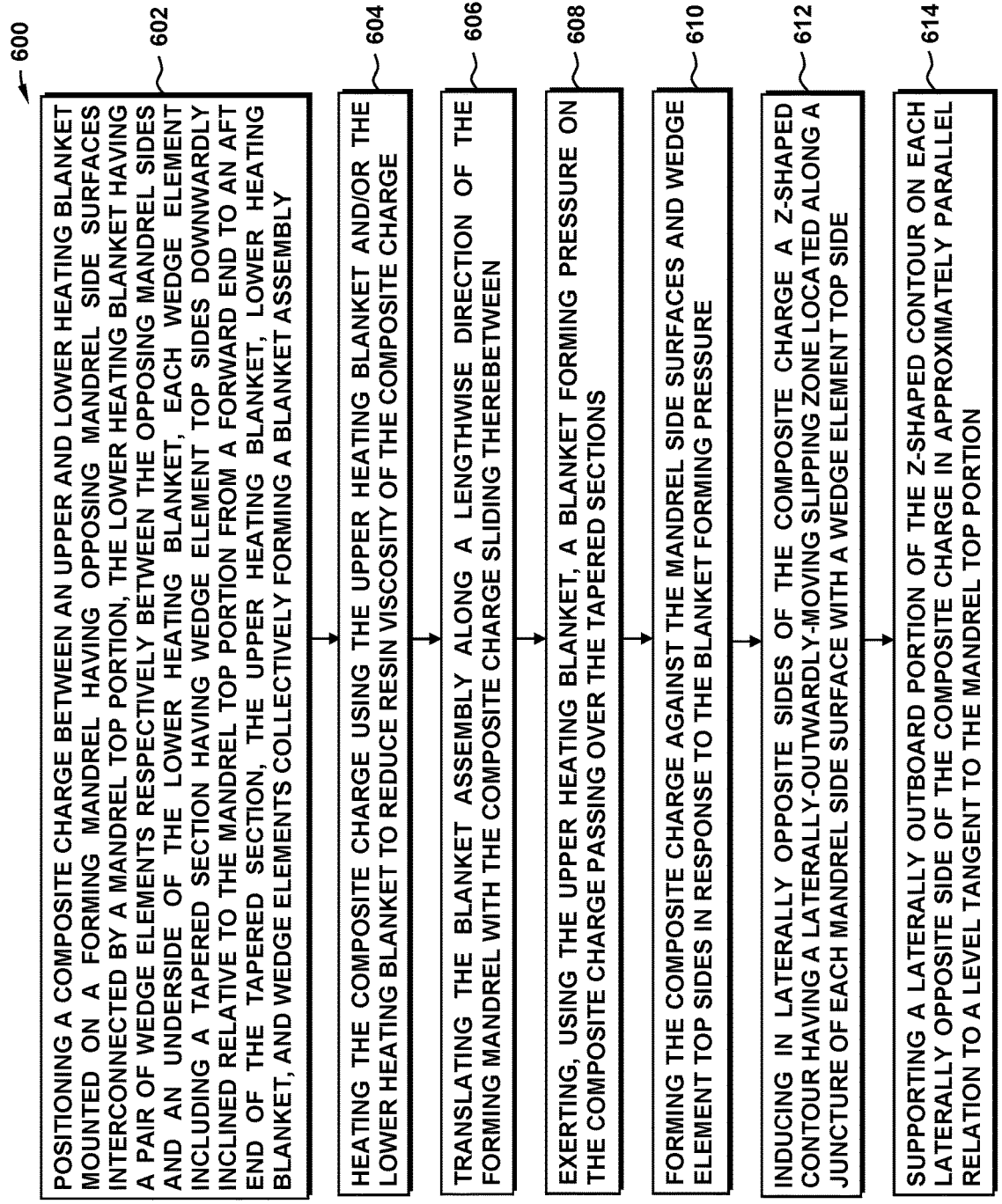
FIG. 28 is a flowchart having one or more operations included in a method of forming a composite charge onto a forming mandrel.

Referring now to the drawings wherein the showings are for purposes of illustrating preferred and various embodiments of the disclosure, shown in FIG. 1 is an aircraft 100 which may incorporate one or more composite structures 102 that may be fabricated using the presently-disclosed heat blanket assembly 340 (FIG. 3) and forming method 600 (FIG. 28). The aircraft 100 may include a fuselage 104 having an empennage including one or more horizontal tails 108 and a vertical tail 110. In addition, the aircraft 100 may include a pair of wings 106 extending outwardly from the fuselage 104. The fuselage 104, the wings 106, the horizontal tails 108, the vertical tail 110, and other components may include a composite skin (not shown) stiffened by a plurality of elongated composite stringers 112. The composite stringers 112 may be fabricated by glide forming an uncured or partially-cured composite charge 500 (FIG. 3) over a forming mandrel 202 (FIG. 3) using the blanket assembly 340 (FIG. 3) and method 600 described herein. FIG. 2 is a perspective view of an example of an L-shaped stringer 114 that may be formed over a forming mandrel 202 using the presently-disclosed blanket assembly 340.

Figure 3:
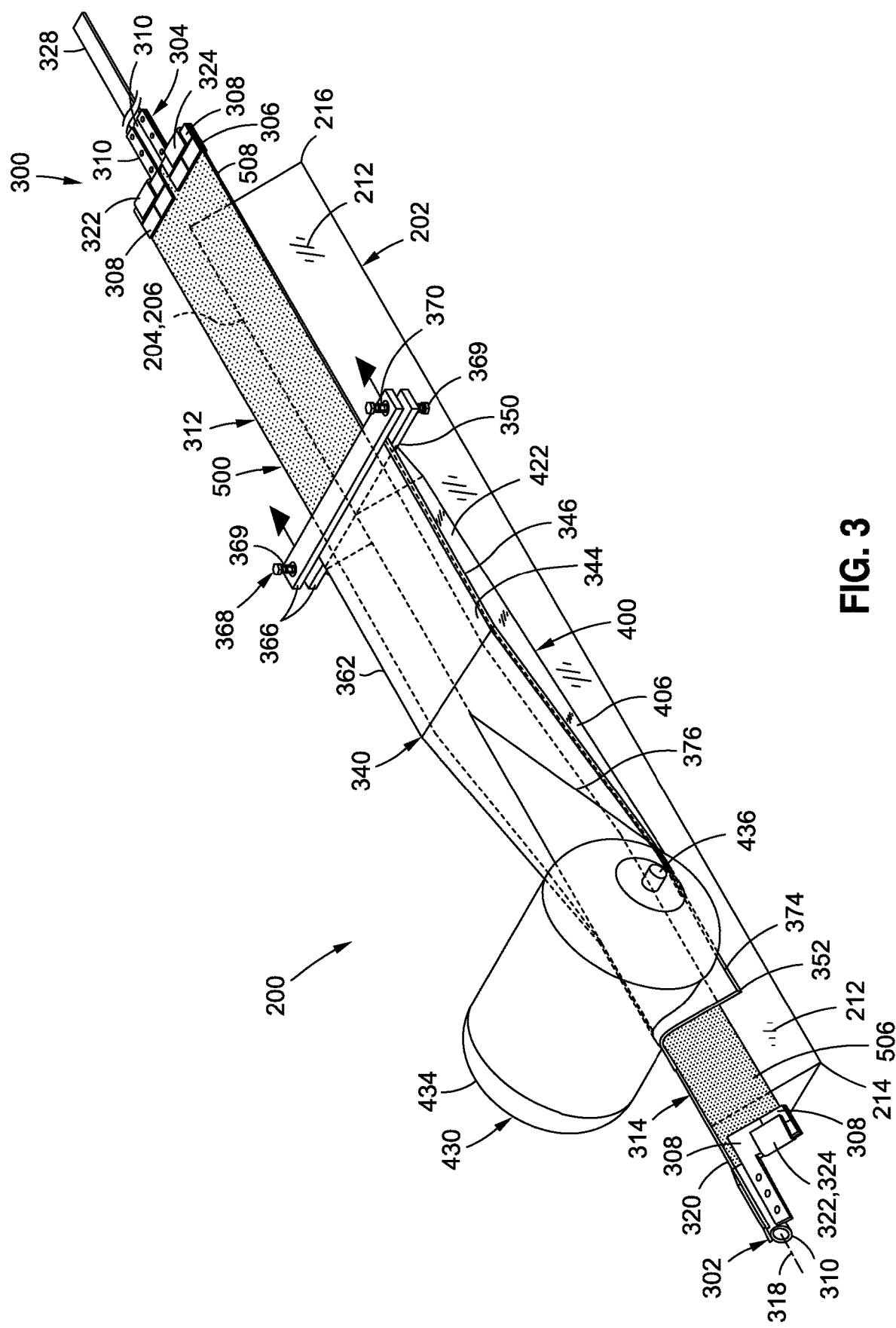
FIG. 3 is a perspective view of an example of a forming system for forming a composite charge onto a forming mandrel by translating the presently-disclosed heat blanket assembly along the forming mandrel while the composite charges slides through the blanket assembly.

FIG. 3 is a perspective view of an example of a forming system 200 for forming a composite charge 500 over a forming mandrel 202 by translating the presently-disclosed blanket assembly 340 along the forming mandrel 202 while the composite charge 500 slides between an upper heating blanket 344 and a lower heating blanket 346 of the blanket assembly 340. Although the blanket assembly 340 is described in the context of forming a composite charge 500 on a forming mandrel 202 having an inverted V-shaped cross-section, the blanket assembly 340 may be sized and configured for forming a composite charge 500 over a forming mandrel 202 having any one of a variety of cross-sectional shapes. For example, although not shown, the blanket assembly 340 may be implemented for forming a composite charge 500 over a forming mandrel having a rectangularly-shaped or trapezoidally-shaped (e.g., omega-shaped) cross-section (not shown) for producing a hat section stringer (not shown) having a horizontal cap interconnecting vertical or inclined sidewalls each terminating at a horizontal base flange.

In FIG. 3, opposing ends of the composite charge 500 are held in respective position relative to opposing ends 214, 216 of the forming mandrel 202. The composite charge 500 is positioned between the upper heating blanket 344 and the lower heating blanket 346 of the blanket assembly 340 which has a blanket forward end 350 (i.e., the heat blanket entrance) and a blanket aft end 352 (i.e., the heat blanket exit). The upper heating blanket 344 and the lower heating blanket 346 each have a blanket width 360 (FIG. 4) that may be wider than the width of the composite charge 500. However, in some examples, the blanket width 360 may be no wider than or narrower than the width of the composite charge 500. The upper heating blanket 344 and/or the lower heating blanket 346 include a heating element 386 (FIG. 4) for heating the composite charge 500 to the reduce the viscosity of resin in the composite charge 500 to facilitate forming of the composite charge 500 over the cross-sectional shape of the forming mandrel 202 under the blanket forming pressure 378 (FIGS. 29-32) applied by the upper heating blanket 344, as described below. The forming system 200 may include a forming device 430 (e.g., an inflatable bladder) supported on a blanket aft extension 374 of the blanket assembly 340. The forming device 430 may be configured to apply forming device pressure 432 (e.g., FIGS. 30-33) to fully conform the composite charge 500 to the cross-sectional shape or contour of the forming mandrel 202 as the blanket assembly 340 and forming device 430 are translated as a unit along the forming mandrel 202 as illustrated in FIGS. 29-34 and described below.

Notably, the blanket assembly 340 includes a pair of wedge elements 400 (e.g., also FIGS. 4, 7-12) positionable against the underside (e.g., FIG. 8) of the lower heating blanket 346. Each one of the wedge elements 400 includes a tapered section 406 (e.g., FIGS. 3-4, 7 and 10-13) along which the composite charge 500 transitions from an initially approximately flat configuration 312 (FIG. 3) at a location forward of the tapered section 406, to an angled configuration 314 (FIG. 3) at a location aft of the tapered section 406 where the composite charge 500 has been generally conformed to the cross-sectional shape of the forming mandrel 202. The weight of the upper heating blanket 344 and optional mass element 380 (FIGS. 15-16) exert the blanket forming pressure 378 (FIGS. 29-32) uniformly over the composite charge 500 to urge the composite charge 500 and lower heating blanket toward the mandrel side surfaces 212 and wedge element top sides 402 (e.g., FIGS. 4, 11, 16) as a means to progressively form the composite charge 500 against the mandrel side surfaces 212 and wedge element top sides 402 (e.g., FIGS. 4, 11, 16) as the blanket assembly 340 is translated along the forming mandrel 202 as illustrated in FIGS. 29-34.

Referring briefly to FIGS. 20-25, the application of the blanket forming pressure 378 on the composite charge 500 against the mandrel side surfaces 212 and the wedge element top sides 402 induces a Z-shaped contour 510 in each of the laterally opposite sides of the composite charge 500 as described below. As noted below, although the mandrel side surfaces 212 of the inverted V-shaped cross-section form an acute angle in FIGS. 20-25, the mandrel side surfaces 212 may be oriented in any one of a variety of angles depending on the angle between the legs of the stringer to be formed by the forming mandrel 202. For example, the mandrel side surfaces 212 may form an acute angle, an obtuse angle, or a right angle. In FIGS. 20-25, each Z-shaped contour 510 has a slipping zone 512 (FIGS. 21, 23, and 25) located along a juncture of each mandrel side surface 212 with a wedge element top side 402. Within each slipping zone 512, the composite plies 504 interlaminarly slip relative to one another due to reduced interlaminar friction due to reduced resin viscosity in the composite charge 500 as a result of heating of the composite charge 500 by the upper heating blanket 344 and/or lower heating blanket 346. At each point along the length of the composite charge 500, the slipping zone 512 on each side of the forming mandrel 202 moves laterally outwardly as the composite charge 500 passes over the tapered sections 406 of the wedge elements 400 during translation of the blanket assembly 340 along the forming mandrel 202. The tapered sections 406 maintain the opposing laterally outboard portions 520 of the composite charge 500 in a horizontal orientation as the composite charge 500 passes over the tapered sections 406.

By maintaining the laterally outboard portions 520 of the composite charge 500 in a horizontal orientation (FIGS. 20-25), the slipping zones 512 have a relatively narrow lateral width. The relatively narrow width of the slipping zones 512 reduces the amount of interlaminar friction or shear force that would otherwise occur between adjacent composite plies 504 if each lateral side of the composite charge 500 were formed against the mandrel side surfaces 212 all at one time, instead of incrementally or progressively forming the composite charge 500 to the mandrel side surfaces 212 using the presently-disclosed blanket assembly 340 and method 600. Advantageously, the reduction in interlaminar friction or shear allows the composite plies 504 to slip relative to one another in a way that reduces or minimizes the buildup of compressive forces in the composite plies 504, thereby preventing the occurrence of localized wrinkling or buckling of the composite plies 504 such as along the apex 206 (FIG. 4) of the forming mandrel 202.

Figure 4:
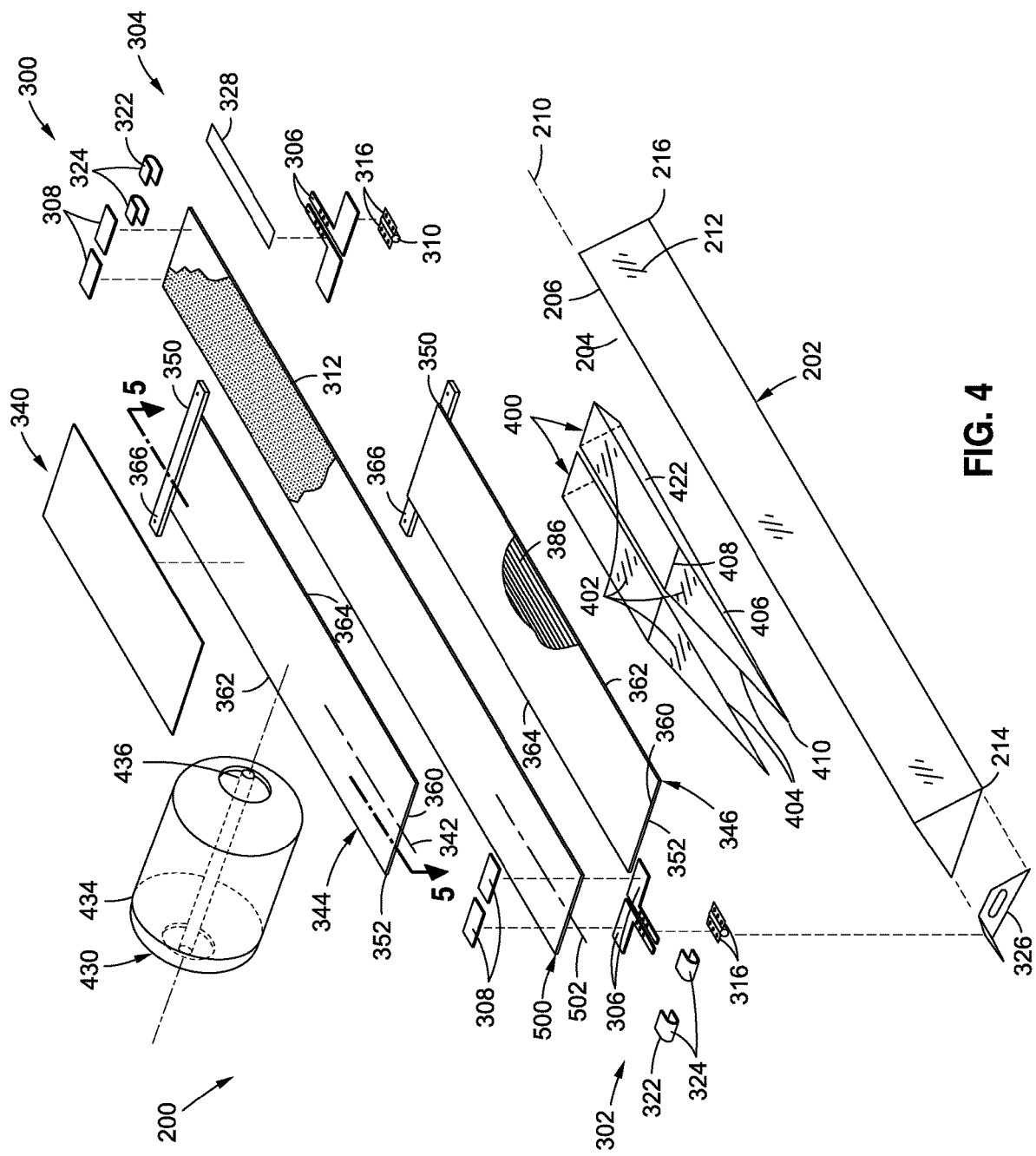
FIG. 4 is an exploded perspective view of the forming system of FIG. 3.

Referring to FIGS. 3-4, as indicated above, the composite charge 500 may initially have an approximately flat configuration 312 prior to being formed in an angled configuration 314 on the forming mandrel 202. The composite charge 500 may initially be laid up as a plurality of composite plies 504 in a stacked formation. The composite plies 504 may be comprised of fiber-reinforced polymer matrix material such as carbon fiber-reinforced epoxy material, and may be provided as prepreg thermosetting material or prepreg thermoplastic material. However, the fiber-reinforced polymer matrix material may be comprised of fibers formed of any material including metal, glass, ceramic, or other fiber compositions. The matrix material may be any type of thermosetting matrix material or thermoplastic matrix material, such as epoxy matrix material.

The composite charge 500 has a charge upstream end 506 and a charge downstream end 508 which may be respectively held in position relative to the mandrel upstream end 214 and the mandrel downstream end 216. The forming mandrel 202 has a mandrel top portion 204 and a pair of opposing mandrel side surfaces 212 which are interconnected by the mandrel top portion 204. In the example of FIG. 3, the mandrel top portion 204 may be described as a radiused apex 206 (e.g., FIG. 13) interconnecting the mandrel side surfaces 212 of the inverted V-shaped cross-section of the forming mandrel 202. The mandrel side surfaces 212 may be oriented in any one of a variety of angles depending on the shape of the stringer to be formed by the forming mandrel 202. For example, the mandrel side surfaces 212 may form an acute angle, an obtuse angle, or a right angle as may be desired for forming an L-shaped stringer, a pair of which may be assembled in back-to-back arrangement to form a T-shaped stringer (not shown). However, as indicated above, the forming mandrel 202 may be provided in any one of a variety of different cross-sectional shapes such as in a hat-shaped cross section (not shown) in which the mandrel top portion may be a horizontally-oriented cap portion for forming a cap of a hat-shaped composite stringer (not shown).

In FIGS. 3-4, the charge upstream end 506 and the charge downstream end 508 may be removably attached, fixed, secured, clamped, and/or held in position relative to the respective mandrel upstream end 214 and mandrel downstream end 216. In example shown, the charge upstream end 506 and the charge downstream end 508 may be clamped in position respectively by an upstream hinge clamp 302 and a downstream hinge clamp 304 of a clamping system 300. The upstream hinge clamp 302 and the downstream hinge clamp 304 may each include a hinge 310 (FIG. 3) having a pair of hinge halves 316 pivotably coupled together by at least one hinge pin (not shown) having a hinge axis 318 (FIG. 3) about which the hinge halves 316 pivot. The hinge axis 318 of the upstream hinge clamp 302 and/or the downstream hinge clamp 304 may be oriented generally parallel to (e.g., within 30 degrees) and/or may be aligned with or approximately coincident with (e.g., within 25 mm) a folding axis 320 (not shown) of the composite charge 500 when conformed to the forming mandrel 202. The folding axis 320 may be defined at an intersection of the mandrel top portion 204 with at least one of the mandrel side surfaces 212, or the folding axis 320 may be defined at the intersection of the pair of mandrel side surfaces 212.

Each hinge 310 allows the composite charge 500 to transition from the initially approximately flat configuration 312 to the angled configuration 314 as the composite charge 500 is progressively conformed to the cross-sectional shape of the forming mandrel 202 during translation of the blanket assembly 340 from the mandrel upstream end 214 to the mandrel downstream end 216. In the example of FIG. 3, the folding axis 320 is generally located at the apex 206 of the forming mandrel 202. However, as indicated above, the forming mandrel may have a hat-shaped cross section (not shown) which may have a corresponding pair of folding axes (not shown) respectively located at the intersection of each one of the mandrel side surfaces with a horizontally-oriented mandrel top portion of the hat-shaped cross section. In this regard, each hinge clamp of a hat-shaped-cross-section forming mandrel (not shown) may have a parallel pair of hinge axes (not shown) positioned approximately parallel to and/or approximately in alignment with the folding axes.

Referring still to FIGS. 3-4, the upstream hinge clamp 302 and the downstream hinge clamp 304 may each include a pair of lower plates 306 arranged in side-by-side relation to each other and respectively coupled to the pair of hinge halves 316. In addition, the upstream hinge clamp 302 and the downstream hinge clamp 304 may each include a pair of upper plates 308 respectively mountable over the pair of lower plates 306. The upstream hinge clamp 302 and the downstream hinge clamp 304 may each also include a pair of clamping devices 322 such as a pair of spring clamps 324 configured to be removably mounted over the pair of upper plates 308 and lower plates 306 for clamping the composite charge 500 between the upper plates 308 and lower plates 306. The upstream hinge clamp 302 may be coupled to the mandrel upstream end 214 by means of a hinge mounting bracket 326 (e.g., FIGS. 4 and 7).

Figure 9:
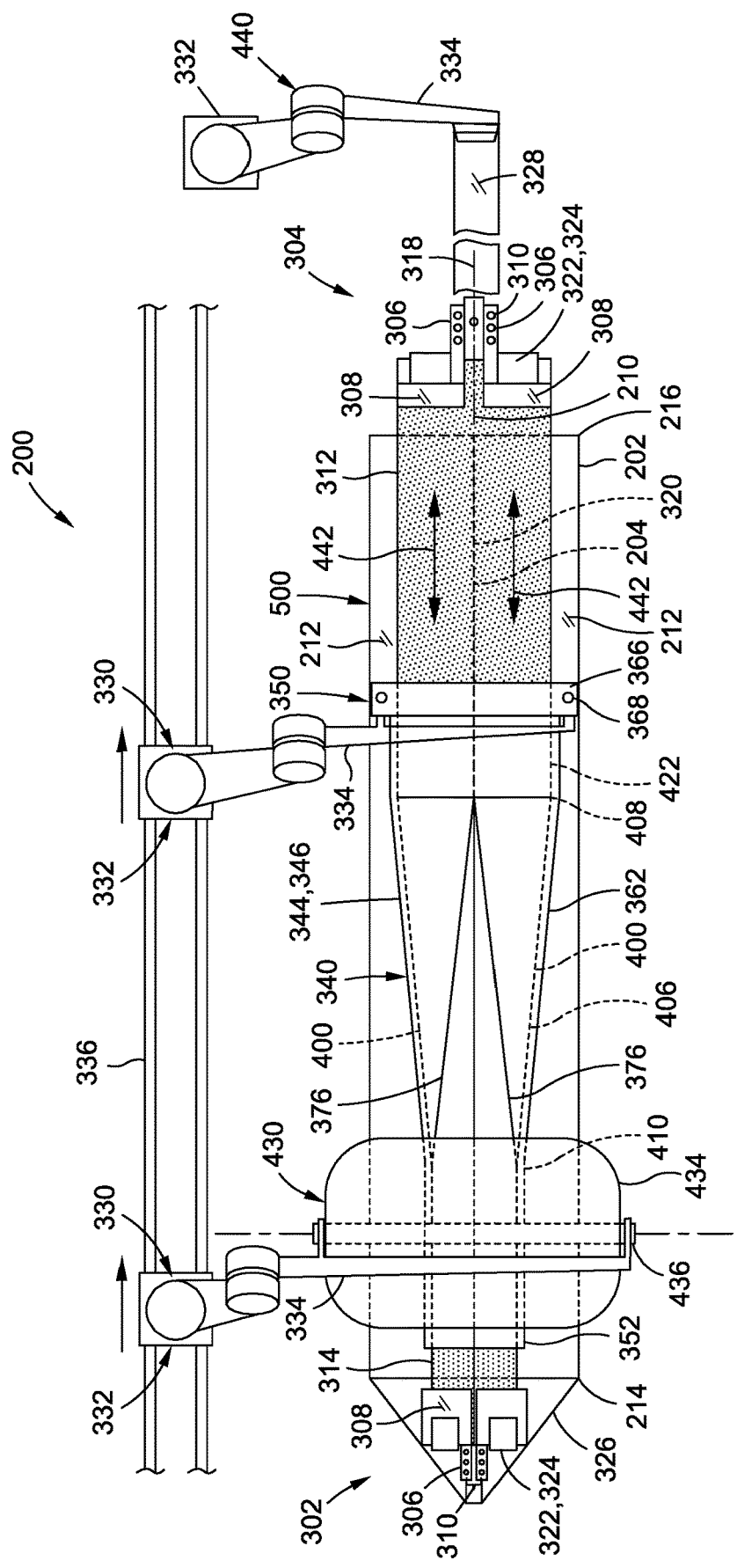
FIG. 9 is a top view of an example of the forming system wherein the blanket assembly is translated along the lengthwise direction of the forming mandrel by one or more robotic devices.

The downstream hinge clamp 304 may be coupled to a charge tensioning mechanism 440 (FIG. 9) which may be configured to apply lengthwise tension 442 (FIG. 9) to the composite charge 500 during forming of the composite charge 500 onto the forming mandrel 202. In the example of FIG. 9, the charge tensioning mechanism 440 may be a robotic device 332 configured to pull on a forward extension element 328 which may be provided as an thin, rigid, elongate strip, bar, or other element extending longitudinally from the downstream hinge clamp 304. The forward extension element 328 may be provided in a length allowing the blanket assembly 340 to be pulled over the entire length of the forming mandrel 202 by a translating mechanism 330 (FIG. 9) such as a robotic device 332, as described in greater detail below. The charge tensioning mechanism 440 may be configured to apply constant lengthwise tension 442 to the composite charge 500 during the forming process as a means to absorb slack that may otherwise develop in the composite charge 500 during translation of the blanket assembly 340 along the forming mandrel 202. In addition, the charge tensioning mechanism 440 may be configured to keep the charge centerline 502 (FIG. 4) of the composite charge 500 centered on the forming mandrel 202 by laterally steering the charge downstream end 508 as the blanket assembly 340 is pushed or pulled (i.e., translated) along the forming mandrel 202 toward the mandrel downstream end 216.

Referring to FIG. 5, shown is an example of an upper heating blanket 344 incorporating one or more heating elements 386. The illustrated configuration of the upper heating blanket 344 may be representative of the configuration of the lower heating blanket 346. The upper heating blanket 344 and/or the lower heating blanket 346 may each include at least one at least one blanket layer. The blanket layer may be formed of a flexible material such as woven fabric or cloth. Alternatively, the blanket layer may be formed of a non-woven material such as a non-fabric membrane. For example, the blanket layer may be formed of a polymeric material such as silicone rubber with or without fiber reinforcing. In some examples, the blanket layer may be formed of a natural material such as cotton or wool and/or the blanket layer may be formed of synthetic material such as fiberglass cloth or aramid fabric. The blanket layer may optionally be coated with silicone, Teflon™, or other low-friction material to promote the sliding of the composite charge 500 between the upper heating blanket 344 and the lower heating blanket 346. In addition, the low friction material may facilitate sliding of the lower heating blanket 346 assembly 340 over the forming mandrel 202 as the blanket assembly 340 is translated along the forming mandrel 202.

Referring to FIGS. 5-6, the heating element 386 may be sandwiched between an upper blanket layer 356 and a lower blanket layer 358 which may be configured similar to the above-described blanket layer. One or more heating elements 386 may be integrated into the upper heating blanket 344 and/or one or more heating elements 386 may be integrated into the lower heating blanket 346. For example, the upper heating blanket 344 and/or the lower heating blanket 346 may include one or more resistive heating elements 386 sandwiched between an upper blanket layer 356 and a lower blanket layer 358. The upper blanket layer 356 and the lower blanket layer 358 may be coupled (e.g., stitched) together with the heating elements 386 sandwiched therebetween. The heating element 386 in FIG. 6 may include an electrically-resistive wire 388 or cord optionally encapsulated by an electrically-insulative sleeve 390. In some examples, each one of the electrically-resistive wires 388 or cords may be formed as a bundle of metallic filaments such as nichrome filaments (i.e., nickel-chrome alloy), and covered or encapsulated by a woven sleeve of electrically resistive and flexible material such as aramid fabric. The quantity of filaments and each bundle may be selected to provide a desired heat 392 output for the composite charge 500.

In FIG. 5, the heating element 386 of the upper heating blanket 344 and/or the lower heating blanket 346 may be arranged as lengthwise sections arranged in spaced parallel relation to one another. The ends of the lengthwise sections may be connected in series to form a continuous electrical circuit. However, the heating element 386 may be arranged in any one a variety of shapes, patterns or configurations, and is not limited to the configuration shown in FIG. 5. Furthermore, the upper heating blanket 344 and/or the lower heating blanket 346 may include a plurality of discrete heating elements 386.

The one or more heating elements 386 of each one of the upper heating blanket 344 and lower heating blanket 346 may be electrically coupled to a controller 398 configured to control the flow of electric current to the heating elements 386. The controller 398 may be configured to indirectly regulate the temperature of the composite charge 500 by regulating the temperature of the heating blankets based on temperature measurements provided to the controller 398 by a plurality of thermocouples 394 (FIG. 5) that may be incorporated into the heating blankets. The controller 398 may be programmed to regulate the temperature of the upper heating blanket 344 and/or the lower heating blanket 346 in a manner to reduce the viscosity of the resin to allow for interlaminar slipping of the composite plies 504 within the slipping zones 512 (e.g., FIGS. 21, 23, 25) of the composite charge 500 to allow the composite charge 500 to progressively conform to the cross-sectional shape of the forming mandrel 202 as the composite charge 500 passes over the tapered section 406 of the wedge elements 400 during translation of the blanket assembly 340 along the forming mandrel 202. In an embodiment, the controller 398 may be configured to limit heating of the composite charge 500 to a temperature below that which may undesirably advance the cure of the resin to a level that may reduce the mechanical properties of the cured composite charge. In some examples, the controller 398 may be configured to prevent overheating of a protective layer 354 (FIG. 7) such as fluorinated ethylene propylene (FEP) film that may applied over the upper surface and lower surface of the composite charge 500, and which overheating may make removal of the protective layer 354 difficult. Depending on the material composition of the composite charge 500 and the forming conditions, the upper heating blanket 344 and/or the lower heating blanket 346 may be operated in temperature range from room temperature (e.g., 20° C.) up to 90° C. for normal forming operations, and up to a maximum temperature of 200° C. or more for high-temperature composite materials. In a non-limiting example, the upper heating blanket 344 and/or the lower heating blanket 346 may each include a triple-redundant thermocouple configuration having a metal braid heat equalizer 396 (FIG. 5) for optimizing heat distribution and temperature regulation.

In an alternative embodiment not shown, the upper heating blanket 344 and/or the lower heating blanket 346 may be configured as a smart susceptor heating blanket (not shown) having magnetic material that is inductively heated in response to a magnetic field generated by a conductor (e.g., a wire, a tube, etc.) to which alternating current is applied (e.g., by a controller 398). The magnetic material may be provided as inductively-heated particles embedded in a thermally conductive matrix material (e.g., silicone) contained within the upper and/or lower heating blanket and through which a conductor may extend such as in a meandering pattern within the smart susceptor heating blanket. In another embodiment, the magnetic material may be provided as a plurality of inductively-heated end-to-end sleeve segments coaxially mounted on a conductor arranged (e.g., in a meandering pattern) within a thermally conductive matrix material contained within the smart susceptor heating blanket. The thermally conductive matrix material facilitates thermal conduction of heat generated by the magnetic material (e.g., particles, susceptor sleeves) to the surface of the smart susceptor heating blanket for heating the portions of the composite charge in contact with the smart susceptor heating blanket. The magnetic material may be selected based on its Curie temperature which is the temperature at which the magnetic material ceases to be magnetic with a corresponding reduction in heat output. The Curie temperature of the magnetic material may correspond to the desired temperature to which the composite charge is to be heated during forming of the composite charge to the contour of the forming mandrel.

Advantageously, the Curie temperature of the magnetic material may be selected to prevent over-heating or under-heating of all portions of the composite charge that are in contact with the smart susceptor heating blanket. In this manner, smart susceptor heating blankets facilitate the uniform application of heat to the composite charge as the composite charge passes through the smart susceptor heating blankets as the smart susceptor heating blankets (e.g., the upper and lower heating blankets) are translated along the forming mandrel. The portions of the smart susceptor heating blankets that have not reached the approximate Curie temperature of the magnetic material continue to heat the locally adjacent portions of the composite charge. Portions of the smart susceptor heating blankets that have reached the approximate Curie temperature cease to conductively heat the locally adjacent portions of the composite charge due to the magnetic material becoming non-magnetic, causing the induced currents generated by the conductor to diminish to a level sufficient to maintain the local temperature of the magnetic material at the Curie temperature. In this manner, the smart susceptor heating blankets inherently limit overheating and under-heating of the composite charge due to the temperature-dependent magnetic properties of the magnetic material. In some examples, the frequency and/or amplitude of the alternating current in the conductor may be adjusted as a means to fine tune the Curie temperature and/or the heating rate of the smart susceptor heating blanket.

Figure 7:
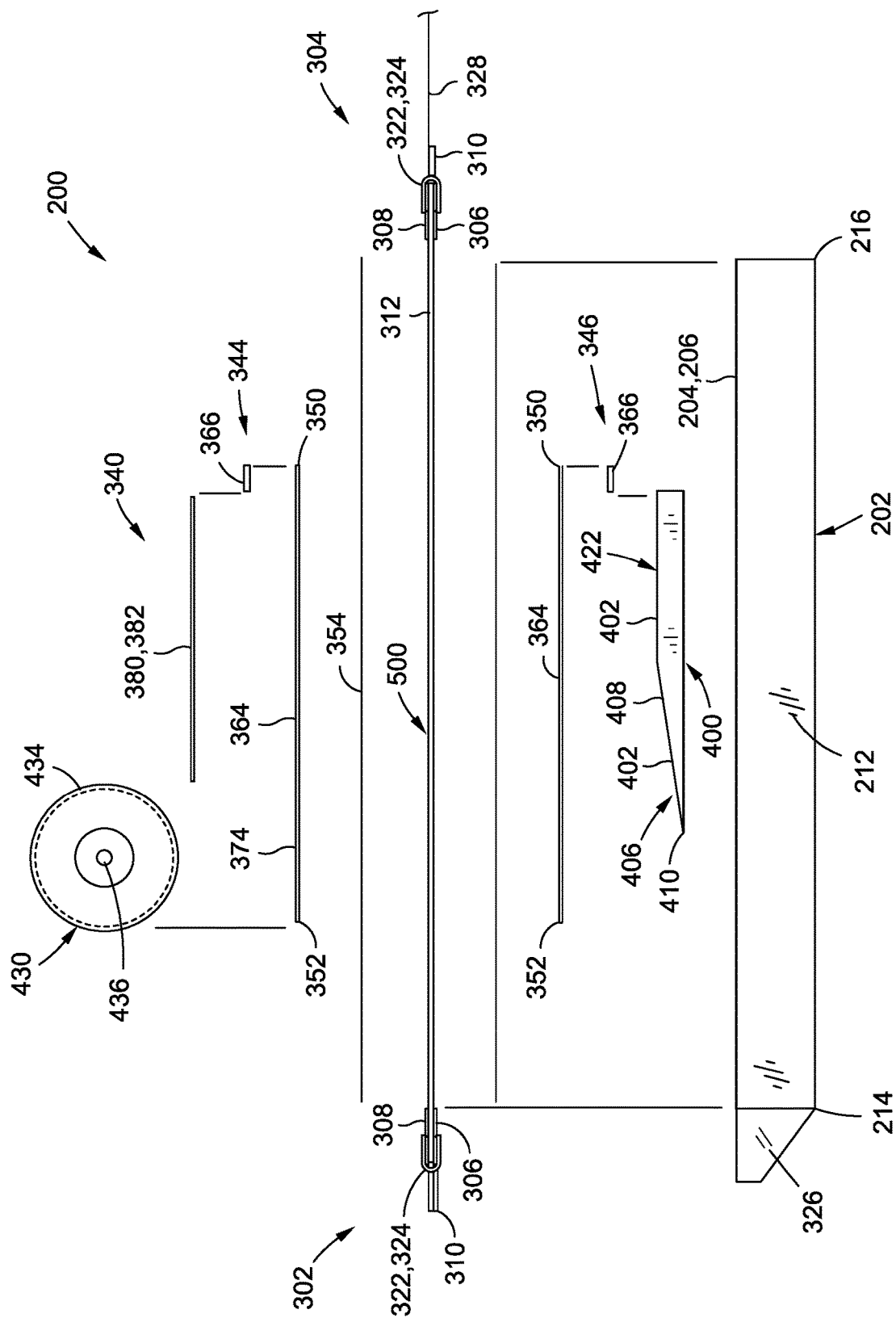
FIG. 7 is an exploded side view of the forming system of FIG. 3.

FIG. 7 is an exploded side view of an example of the forming system 200 showing the composite charge 500 located between the upper heating blanket 344 and the lower heating blanket 346. The opposing ends of the composite charge 500 may extend past the respective opposing mandrel upstream end 214 and mandrel downstream end 216. As mentioned above, the charge upstream end 506 may be clamped to an upstream hinge clamp 302 fixedly coupled to a hinge mounting bracket 326 located at the mandrel upstream end 214. The charge downstream end 508 may be coupled to a downstream hinge clamp 304 which may be coupled to a charge tensioning mechanism 440 (FIG. 9) at the mandrel downstream end 216. The upper heating blanket 344 and the lower heating blanket 346 each have a blanket length 364 extending between the blanket forward end 350 and the blanket aft end 352, and which is shorter than the length of the composite charge 500. The upper heating blanket 344 and the lower heating blanket 346 are preferably aligned with each other at the blanket forward end 350 and at the blanket aft end 352. The upper heating blanket 344 and the lower heating blanket 346 may each include the above-mentioned blanket aft extension 374 located upstream of the tapered sections 406 of the wedge elements 400. The blanket aft extension 374 provide a location where the forming device 430 (e.g., an inflatable bladder) may be supported. In some examples, the blanket aft extension 374 may be devoid of heating elements 386. An optional mass layer 382 may be applied over the upper heating blanket 344 to increase the blanket forming pressure 378 on the composite charge 500 at least along the length of the tapered sections 406.

Referring still to FIG. 7, a removable protective layer 354 (e.g., peel ply) may be included between the upper heating blanket 344 composite charge 500, and between the lower heating blanket 346 and the composite charge 500, as mentioned above. The protective layer 354 may be a layer of film of polyester, nylon, fluorinated ethylene propylene (FEP), or other material that may be applied to the composite charge 500 after layup of the composite plies 504, or during the process of installing the blanket assembly 340 and composite charge 500 on the forming mandrel 202. The protective layer 354 may prevent contamination of the composite charge 500 during the forming process and may facilitate sliding of the composite charge 500 between the blanket assembly 340. The protective layer 354 may be removed prior to curing or to bonding the cured composite structure 102 to another composite part.

Also shown in FIG. 7 are the wedge elements 400 which are positioned between the underside of the lower heating blanket 346 and the mandrel side surfaces 212 of the forming mandrel 202. Each one of the wedge elements 400 has a wedge element top side 402 and a wedge element 400 inner surface that extends along the length of the wedge element 400. In addition, each one of the wedge elements 400 has a tapered section 406 and, optionally, a forward section 422. The tapered section 406 extends between a tapered section forward end 408 and a tapered section aft end 410. As mentioned above, the tapered sections 406 are configured to transition the composite charge 500 from an initially approximately flat configuration 312 (FIG. 3) to an angled configuration 314 (FIG. 3) corresponding to the cross-sectional shape of the forming mandrel 202, as shown in FIG. 3 and mentioned above.

In FIG. 7, the wedge elements 400 each include the forward section 422 located forward of the tapered section forward end 408. The forward edge of the forward sections 422 may be aligned with or located at the same lengthwise location on the forming mandrel 202 as the blanket forward end 350 of the upper heating blanket 344 and lower heating blanket 346. The wedge element 400 forward section 422 may provide a location for supporting the composite charge 500 in the initially approximately flat configuration 312 to allow for heating the composite charge 500 and reducing the resin viscosity prior to the composite charge 500 passing over the tapered sections 406 of the wedge elements 400 during translation of the blanket assembly 340 along the forming mandrel 202.

Referring to FIGS. 8-12, the pair of wedge elements 400 are positionable against the underside of the lower heating blanket 346 and are oriented in generally lengthwise parallel relation to each other along a lengthwise direction of the lower heating blanket 346. In addition, the wedge element inner sides 404 are configured to be respectively positioned against the opposing mandrel side surfaces 212 of the forming mandrel 202 when the lower heating blanket 346 is mounted on the forming mandrel 202. The wedge element inner side 404 is configured to be placed in direct or indirect contact with a mandrel side surface 212. The pair of wedge elements 400 may be permanently or removably attached to the lower heating blanket 346. For example, the wedge element top sides 402 may be attached directly to the underside of the lower heating blanket 346 by adhesive bonding, stitching, mechanical attachment, Velcro™, or any one of a variety of other attachment mechanisms.

Figure 16:
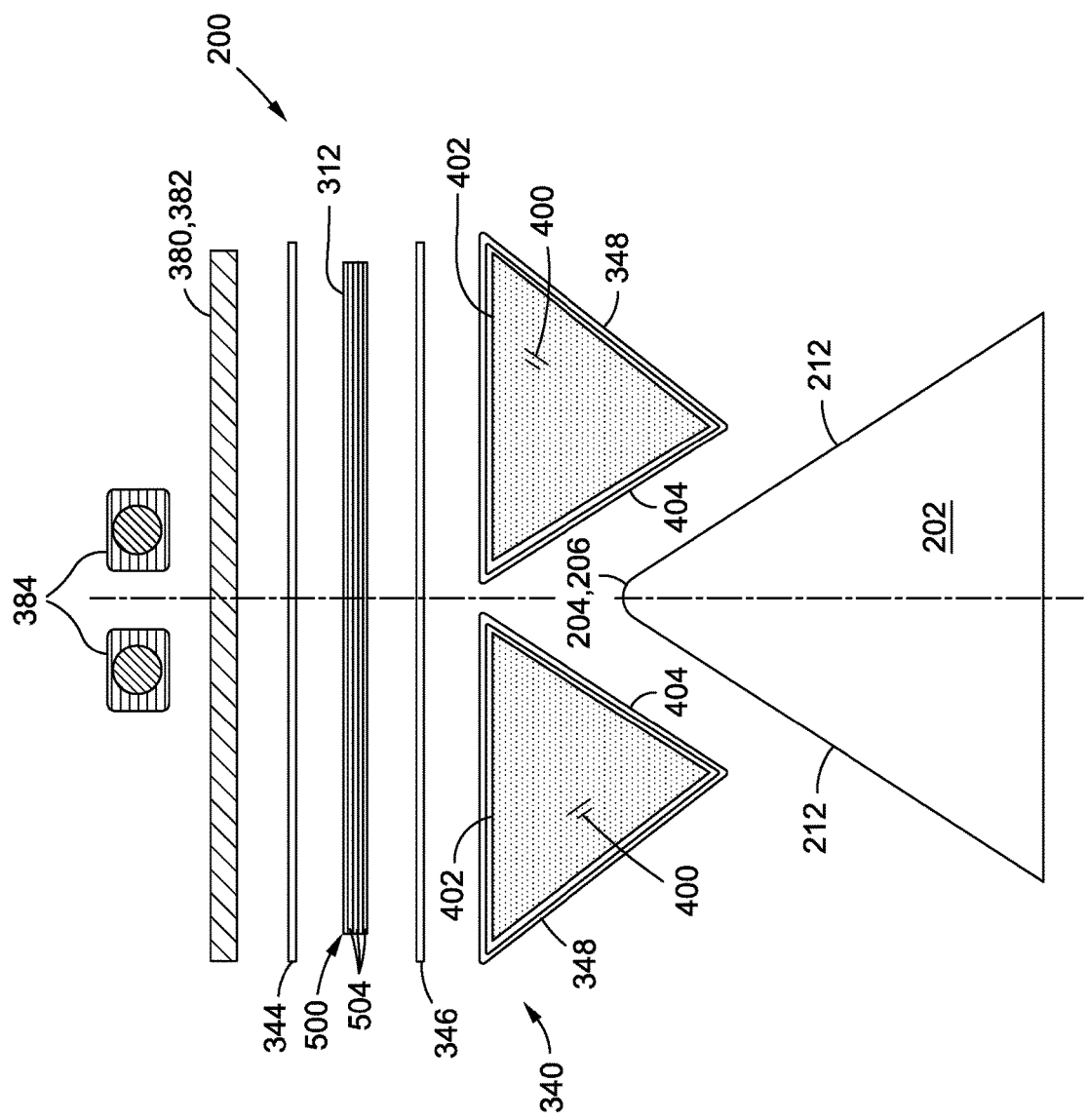
FIG. 16 is an exploded cross-sectional view of the forming system illustrating the mass elements in the form of mass strips and/or mass layers mountable on top of the blanket assembly.

Referring briefly to FIG. 16, in an alternative embodiment, the wedge elements 400 may be supported by the lower heating blanket 346 by a pair of wedge element sleeves 348 of the lower heating blanket 346. Each one of the wedge element sleeves 348 may be sized and configured to receive a wedge element 400. Each wedge element sleeve 348 geometry, when viewed in transverse cross section, is configured to be substantially equivalent to the geometry of the wedge element 400 such that each wedge element sleeve 348 surrounds a wedge element 400. The wedge element sleeves 348 may be formed of the same material as the blanket layer such as aramid fabric.

Referring again to FIGS. 8-12, the wedge elements 400 may be configured such that the wedge element top sides 402 are approximately (e.g., within 13 mm) flush with the mandrel top portion 204 along the wedge element 400 forward sections 422 and at the forward end of the tapered sections 406. As mentioned above, the mandrel top portion 204 may be described as the uppermost point on the forming mandrel 202. For the inverted V-shaped forming mandrel 202 illustrated in the figures, the mandrel top portion 204 may be described as the uppermost portion of the radiused apex 206 joining the mandrel side surfaces 212. When the forming mandrel 202 is viewed from the side (e.g., FIG. 10), the tapered section 406 of each one of the wedge elements 400 tapers or reduces in height along a direction from the tapered section forward end 408 to the tapered section aft end 410.

Figure 25:
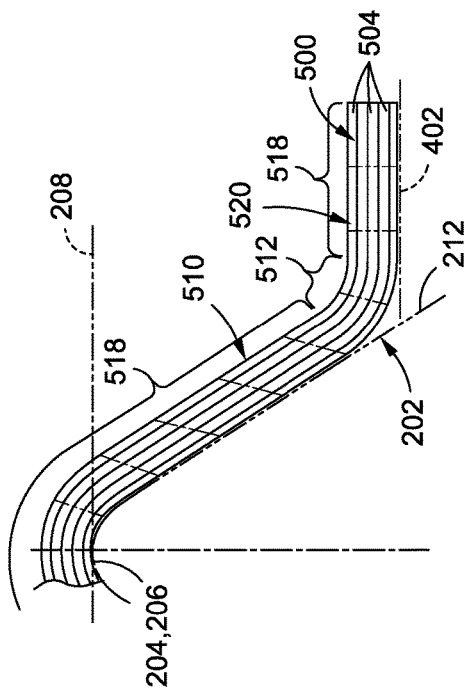
FIG. 25 is a magnified sectional view of the composite charge taken along line 25 of FIG. 24 and illustrating the laterally-outwardly-moving slipping zone and the non-slipping zones on opposite sides of the slipping zone and the laterally outboard portion of the composite charge maintained in a horizontal orientation by the wedge elements.

When the wedge elements 400 and the lower heating blanket 346 are mounted on the forming mandrel 202 and viewed in transverse cross-section (e.g., FIGS. 18-24), the wedge element top sides 402 are approximately parallel (e.g., within 30 degrees) with each other and approximately parallel (e.g., within 30 degrees) to a level tangent 208 to the mandrel top portion 204 as shown in FIGS. 21, 23, and 25 and described below. The wedge element top sides 402 are approximately horizontal at any point along the length of the tapered section 406 when the wedge elements 400 and the lower heating blanket 346 are mounted on the forming mandrel 202. By configuring the wedge element top sides 402 to be approximately parallel to the level tangent 208, the opposing lateral outboard portions 520 of the composite charge 500 are maintained in substantially parallel relation (e.g., horizontal) to the level tangent 208 (e.g., also horizontal). As mentioned above, the blanket forming pressure 378 applied to the composite charge 500 by the upper heating blanket 344 forces each side of the composite charge 500 into a generally Z-shaped configuration (FIGS. 20-25) during translation of the blanket assembly 340 along the forming mandrel 202.

Referring to FIG. 9, as mentioned above, the blanket assembly 340 may be translated along the forming mandrel 202 by a translating mechanism 330 such as a robotic device 332 that may be movable along a track system 336. The forming device 430 may also be translated in unison with the blanket assembly 340 by a separate translating mechanism 330 which may also be movable along the track system 336. Alternatively, the blanket assembly 340 and the forming device 430 may be translated along the forming mandrel 202 by the same translating mechanism 330. In a further embodiment, the blanket assembly 340 and/or the forming device 430 may be translated along the forming mandrel 202 by an overhead gantry (not shown), or by any one a variety of other mechanisms configured to translate the blanket assembly 340 and forming device 430 from the mandrel upstream end 214 toward the mandrel downstream end 216. The translating mechanism 330 that translates the forming device 430 may also apply downward force on the forming device 430 for exerting forming device pressure 432 onto the blanket assembly 340 for assisting in conforming the composite charge 500 to the cross-sectional shape of the forming mandrel 202.

Figure 8:
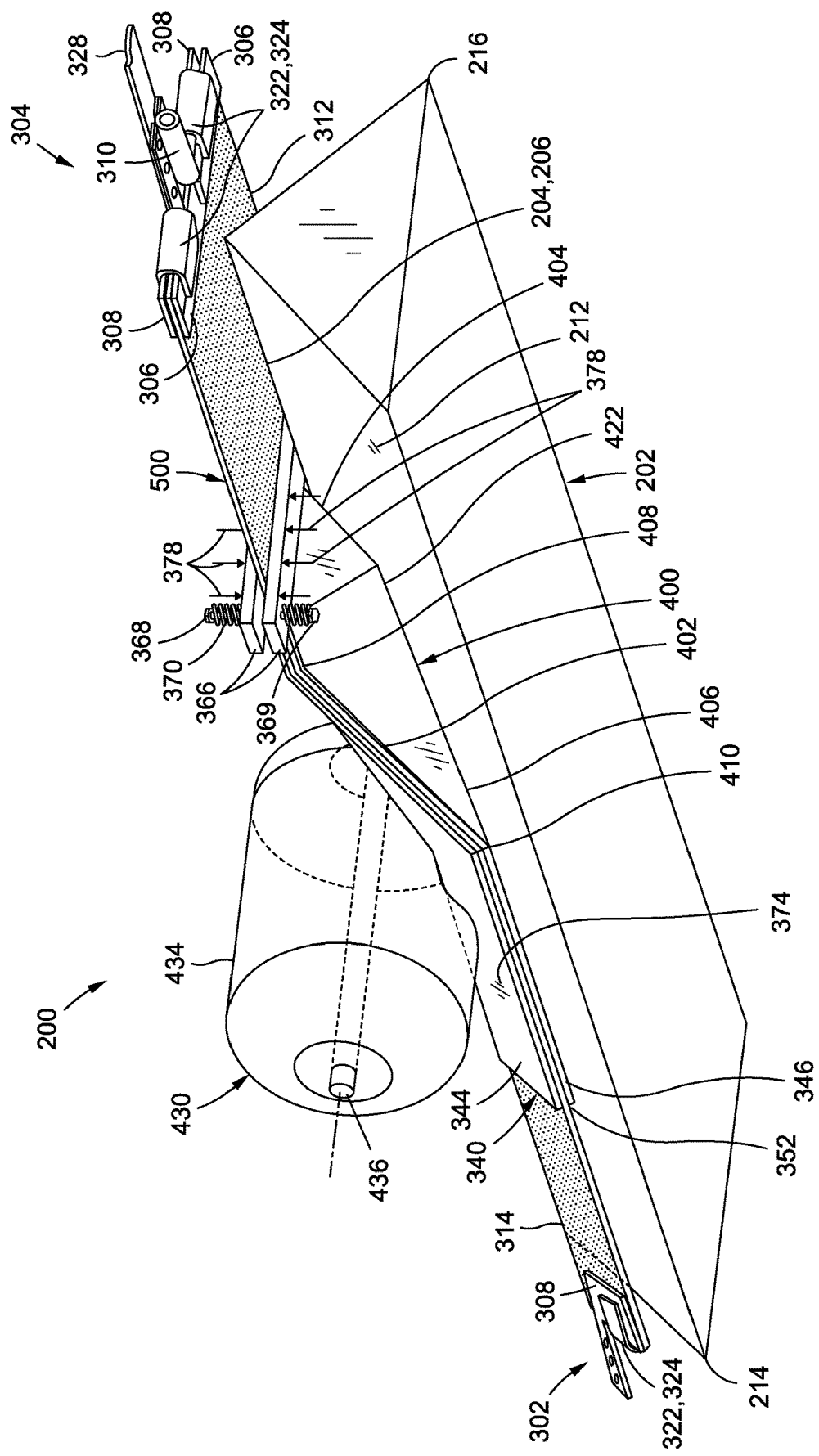
FIG. 8 is a perspective view of the forming system looking upwardly toward an underside of the blanket assembly and illustrating a wedge element for progressively forming the composite charge into the cross-sectional shape of the forming mandrel as the blanket assembly is translated along the forming mandrel.
Figure 10:
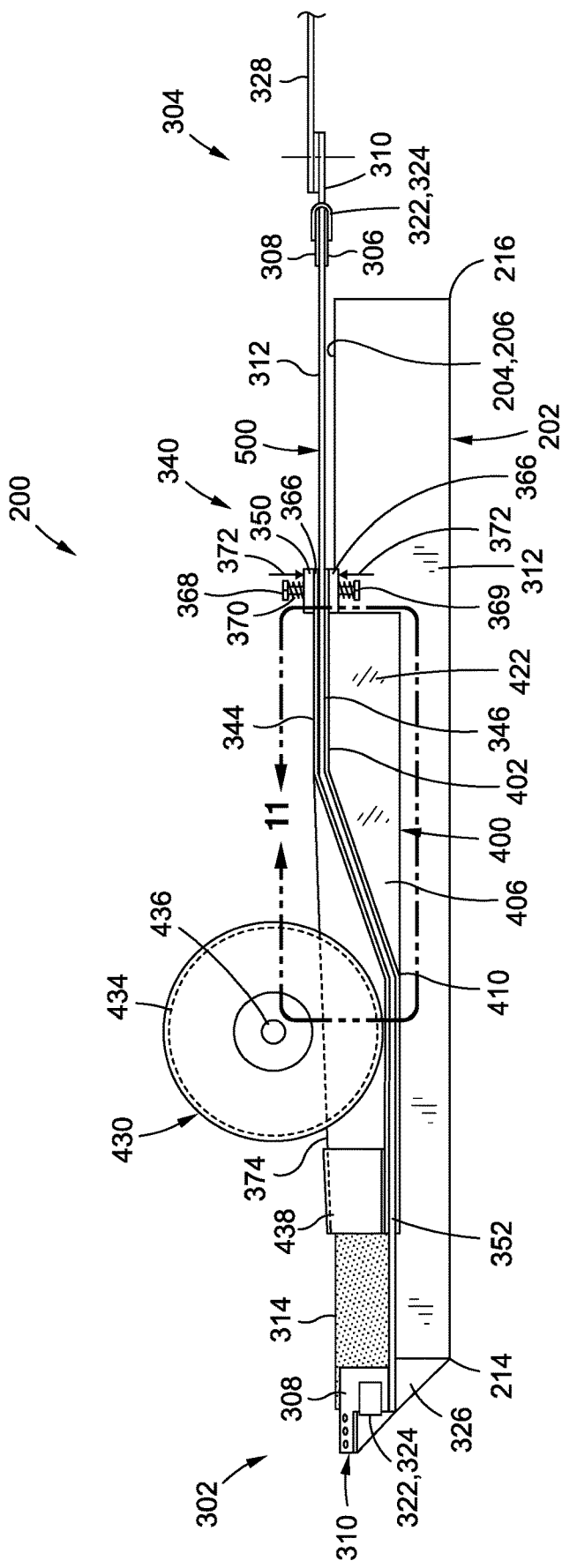
FIG. 10 is a side view of an example of the forming system during translation of the blanket assembly along the forming mandrel while the composite charge is held stationary relative to the forming mandrel.

As shown in FIGS. 8-10, the upper heating blanket 344 and the lower heating blanket 346 may each include a rigid element 366 at the blanket forward end 350. The rigid elements 366 may be engaged by the translating mechanism 330 (FIG. 9) for translating the blanket assembly 340 along the forming mandrel 202. The rigid elements 366 may provide a structurally rigid location at which the blanket assembly 340 may be pushed or pulled by the translating mechanism 330. The rigid elements 366 may each be a generally flat and/or straight bar, plate, rod or other rigid member formed of metallic material or non-metallic material. As shown in FIGS. 8-9, the rigid element 366 of the upper heating blanket 344 and/or the rigid element 366 of the lower heating blanket 346 may be wider that the blanket width 360 such that opposing ends of the rigid elements 366 protrude beyond the blanket side edges 362 to provide a location where the rigid elements 366 can be engaged by the translating mechanism 330.

In FIG. 10, as mentioned above, the upper heating blanket 344 and the lower heating blanket 346 may each include a blanket aft extension 374 extending aftwardly of the tapered section aft end 410. In an embodiment, the blanket aft extension 374 may have a length that is at least 20 percent of the tapered section length 412. As mentioned above, the forming device 430 may be configured to apply forming device pressure 432 onto the composite charge 500 against the mandrel side surfaces 212 after the composite charge 500 has been transitioned from an approximately flat configuration 312 (FIG. 3) to the angled configuration 314 (FIG. 3) in which the composite charge 500 is conformed to the cross-sectional shape of the forming mandrel 202. The forming device 430 may be provided as an elastomeric and/or resiliently compressible element. In one example, the forming device 430 may be provided as a rollable element 434 such as an inflatable roller or bladder. Such a rollable element 434 may be initially rollable in an upstream direction along the tapered section 406 as shown in FIG. 30 to conform the composite charge 500 against the mandrel side surfaces 212 and wedge element top sides 402 of the tapered sections 406. After the rollable element 434 has been rolled over the tapered sections 406 along the upstream direction, the rollable element 434 is held stationary on the blanket aft extension 374 and is moved as a unit with the blanket assembly 340 during translation along the forming mandrel 202 as shown in FIGS. 31-33 described below. The blanket assembly 340 may optionally include a forming plate 438 mounted on the blanket aft extension 374 at a location upstream of the forming device 430 for further conforming the composite charge 500 to the cross-sectional shape of the forming mandrel 202.

Referring to FIGS. 8-10, the rigid elements 366 of the upper heating blanket 344 and the lower heating blanket 346 may be urged toward each other to generate a blanket entrance clamping pressure 372 on the composite charge 500. The blanket entrance clamping pressure 372 may induce lengthwise tension 442 in the composite charge 500 along the section of the composite charge 500 between the rigid elements 366 and the forming device 430 when the blanket assembly 340 is translated (e.g., pushed or pulled) along the forming mandrel 202 by the translating mechanism 330 engaged to the rigid elements 366. In some examples, the lengthwise tension 442 may be on the order of approximately 30 kilograms (kg) of tension force applied to each of the upper heating blanket 344 and lower heating blanket 346 for a total tension force of approximately 60 kg. however, the lengthwise tension 442 may exceed 80 kg of force (i.e., 40 kg each blanket). The lengthwise tension 442 may reduce or prevent the formation of wrinkles and/or creases in the composite charge 500 that would otherwise occur during formation of the Z-shaped contour 510 when the composite charge 500 passes along the tapered sections 406.

In FIGS. 8-10, the blanket assembly 340 may include one or more spring mechanisms 368 configured to urge the rigid elements 366 toward each other. In one embodiment, the spring mechanisms 368 may be located on opposing ends of the rigid elements 366. For example, the spring mechanisms 368 may comprise a pair of threaded rods 369 extending through holes respectively formed in opposing ends of each of the rigid elements 366 as shown in FIG. 8. Clamping springs 370 may be mounted on each of opposing ends of each of the threaded rods 369 at the opposing ends of the rigid elements 366 for adjustably generating the blanket entrance clamping pressure 372 on the composite charge 500. In an alternative embodiment, the blanket entrance clamping pressure 372 may be generated by actuators (not shown) mounted to the rigid elements 366, such as electoral-mechanical actuators, pneumatic actuators, or any other type of mechanism capable of urging the rigid elements 366 toward one another to generate the blanket entrance clamping pressure 372 on the composite charge 500. As a result of the blanket entrance clamping pressure 372, lengthwise tension 442 is generated in the composite charge 500 between the rigid elements 366 and the forming device 430 during translation of the blanket assembly 340 along the forming mandrel 202 by pushing or pulling the rigid elements 366 (e.g., via the translating mechanism 330—FIG. 9). The lengthwise tension 442 generated by pushing or pulling the rigid elements 366 for translating the blanket assembly 340 may be greater that the lengthwise tension 442 applied to the charge downstream end 508 by the above-described charge tensioning mechanism 440, as a means to accommodate or absorb a slight increase in length of the composite charge 500 as the blanket assembly 340, via the blanket entrance clamping pressure 372, applies lengthwise tension to the composite charge 500.

Figure 11:
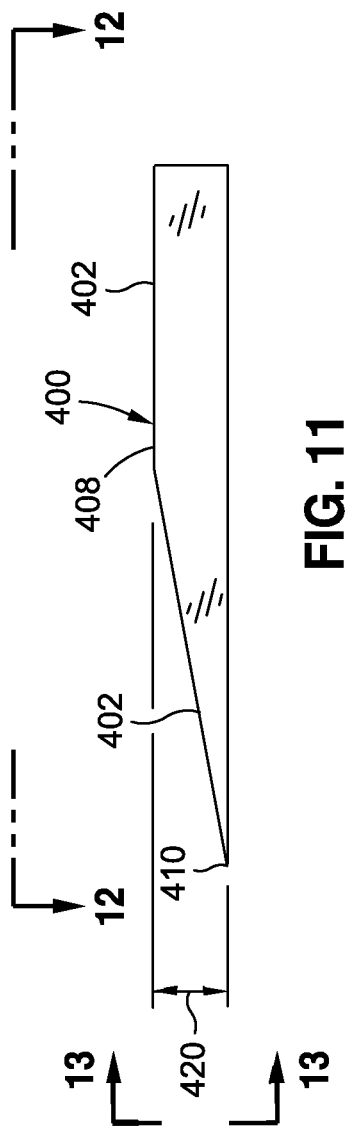
FIG. 11 is a side view of an example of a wedge element having a tapered section along which the composite charge is progressively formed into the cross-sectional shape of the forming mandrel.
Figure 13:
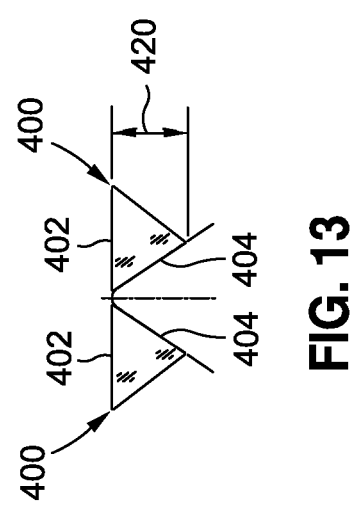
FIG. 13 is an end view of an example of a pair of the wedge elements.
Figure 12:
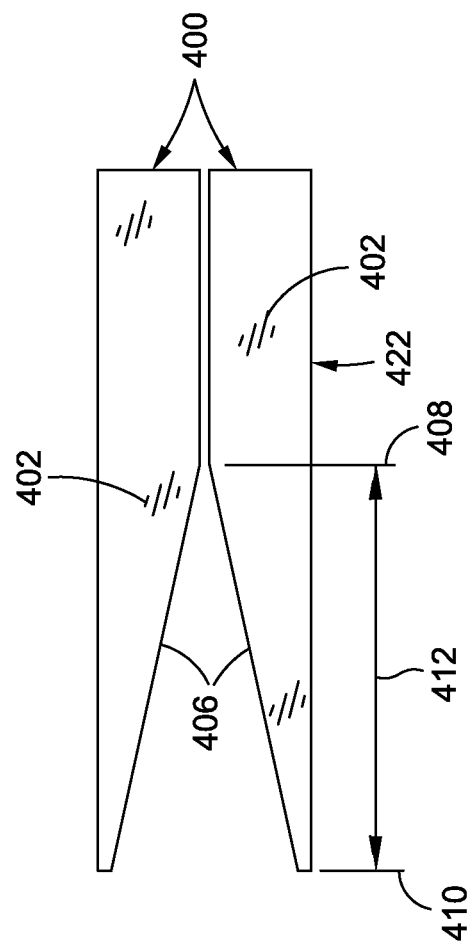
FIG. 12 is a top view of an example of a pair of wedge elements mountable on opposing sides of the forming mandrel.

Referring to FIGS. 11-13 and 15, the wedge elements 400 may be provided in a geometry that allows lengthwise tension 442 generated in the composite charge 500 at the rigid elements 366 to reduce or prevent the occurrence of wrinkles along the diagonal notch 376 (FIGS. 3, 9) in the composite charge 500 on opposite sides of the forming mandrel 202 due to the transition of the composite charge 500 from the approximately flat configuration 312 at the tapered section forward end 408 to the angled configuration 314 at the tapered section aft end 410. As shown in FIGS. 11-13, the tapered section 406 of each of the wedge elements 400 has a tapered section length 412 which may be described as the distance between the tapered section forward end 408 and the tapered section aft end 410 measured along a direction parallel to the lengthwise direction of the formal mandrel when the blanket assembly 340 is mounted to the forming mandrel 202. In addition, each one of the tapered sections 406 has a tapered section depth 420 which may be described as the vertical distance from the level tangent 208 (FIG. 13) to the wedge element top side 402 at the tapered section aft end 410. The vertical distance may be measured along a direction normal to the level tangent 208 to the mandrel top portion 204 when the blanket assembly 340 is mounted to the forming mandrel 202, and is the distance between the wedge element top side 402 at the tapered section forward end 408 and the wedge element top side 402 at the tapered section aft end 410. In an embodiment, the wedge element 400 may be configured such that the tapered section length 412 is at least 2 times the tapered section depth 420.

Referring to FIG. 14, by configuring the tapered section length 412 (FIG. 12) to be at least 2 times the tapered section depth 420 (FIGS. 11 and 13), the composite charge 500 may have a sufficient length of material to allow the lengthwise tension 442 generated in the composite charge 500 during pulling of the rigid elements 366 to reduce or prevent the occurrence of wrinkles in the composite charge 500 along the diagonal notches 376, and which wrinkles may otherwise occur due to the transition in geometry of the composite charge 500 from the approximately flat configuration 312 at the tapered section forward end 408 to the angled configuration 314 at the tapered section aft end 410. As shown in FIG. 14, for the section of the composite charge 500 instantly located between the tapered section forward end 408 and the tapered section aft end 410, the composite charge 500 has a first length 414 measured along the mandrel centerline 210, a second length 416 measured along each one of the outboard lateral edges of the composite charge 500, and a third length 418 measured along the diagonal notch 376 on each side of the forming mandrel 202.

When the composite charge 500 is in the approximately flat configuration 312, the third length 418 is the hypotenuse of a triangle of which the first length 414 is one of the sides, and wherein the first length 414 is equal to the second length 416. With the composite charge 500 in the approximately flat configuration 312, the third length 418 is greater than the first length 414 and the second length 416. As the blanket assembly 340 is translated along the forming mandrel 202 and the composite charge 500 is conformed into the configuration as shown in FIG. 14, there is excess composite charge material along the third length 418 which may result in the occurrence of generally lengthwise-oriented wrinkles in the composite charge 500. However, by configuring the wedge elements 400 such that the tapered section length 412 is at least 2 times the tapered section depth 420, a sufficient length of composite charge material is provided to allow the lengthwise tension 442 exerted by the translating mechanism 330 (FIG. 9) at the rigid elements 366 to reduce or prevent the occurrence of generally lengthwise wrinkles.

Referring to FIGS. 11-13 and 15, the wedge elements 400 may be formed of resiliently compressible material configured to allow the wedge elements 400 to conform to localized variations (not shown) in the cross-sectional shape of the forming mandrel 202 along the lengthwise direction. For example, the wedge elements 400 may be formed of foam such as open-cell foam, closed-cell foam, rubber, foamrubber, or any other resiliently compressible material. Alternatively, for cases where the forming mandrel 202 has a substantially constant cross-sectional shape along the lengthwise direction, the wedge elements 400 may be formed of non-compressible material. For example, the wedge elements 400 may be formed of rigid material such as metallic material (e.g., aluminum) and/or rigid nonmetallic material such as plastic, Styrofoam™, fiber-reinforced polymer matrix material such as fiberglass, or other rigid material.

Figure 15:
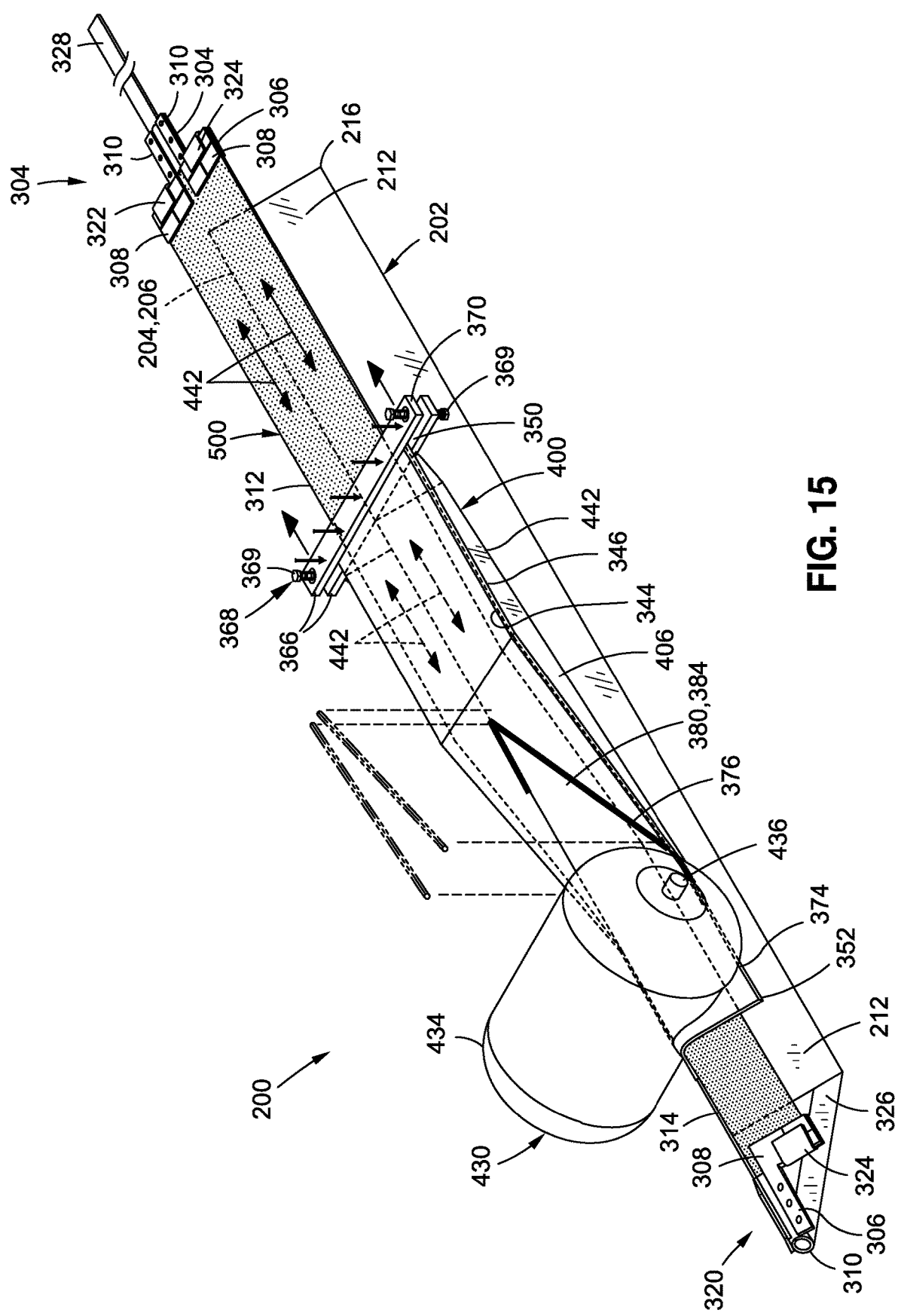
FIG. 15 is a perspective view of an example of the forming mandrel and optional mass elements for increasing the blanket forming pressure applied by the upper heating blanket for progressively forming the composite charge into the cross-sectional shape of the forming mandrel along the tapered section of the wedge elements.

Referring to FIGS. 7, 15, and 16, the blanket assembly 340 may optionally include at least one mass element 380 that may be mounted on top of the upper heating blanket 344. The mass element 380 may increase the magnitude of the blanket forming pressure 378 for progressively conforming the composite charge 500 to the cross-sectional shape of the mandrel side surfaces 212 and wedge element top sides 402 as the composite charge 500 passes over the tapered section 406 of the wedge elements 400 during translation of the blanket assembly 340 along the forming mandrel 202. The mass element 380 may be removably or permanently mountable on top of the upper heating blanket 344.

In FIG. 7, the mass element 380 may be provided as a mass layer 382 or sheet that may be placed on top of the upper heating blanket 344 and secured using permanent or removable attachment means such as adhesive, Velcro™ mechanical fastening, or other means. The mass layer 382 may extend partially or entirely between the blanket forward end 350 and the blanket aft end 352, and partially or entirely between opposing blanket side edges 362 of the upper heating blanket 344. In an embodiment, the mass layer 382 may extend from a tapered section forward end 408 to a tapered section aft end 410 to providing a uniformly distributed increase in blanket forming pressure 378. In this regard, the combination of the upper heating blanket 344 and the optional mass layer 382 may urge the composite charge 500 to conform to the cross-sectional shape collectively defined by the mandrel side surfaces 212 and the wedge elements top sides 402 for forming the laterally opposite sides of the composite charge 500 into the Z-shaped contours 510 as the composite charge 500 passes over the tapered sections 406, as described above and illustrated in FIGS. 20-25.

The mass layer 382 may be formed of material that is flexible in the out-of-plane direction. For example, the mass layer 382 may be provided as one or more layers of dense fabric formed of natural material such as wool, and/or the mass layer 382 may be provided as one or more layers of synthetic material such as silicone rubber sheeting or other flexible material. The flexible nature of the mass layer 382 may allow the mass layer 382 to conform to the cross-sectional shape of the forming mandrel 202 and the wedge elements 400 as the composite charge 500 passes over the tapered sections 406 of the wedge elements 400. Alternatively, the mass layer 382 may be positioned on top of the upper heating blanket 344 and/or the mass layer 382 may be sandwiched between the upper blanket layer 356 and lower blanket layer 358 of the upper heating blanket 344.

In FIGS. 15-16, the mass element 380 may be provided as a pair of discrete mass strips 384 positioned over or attached to the upper heating blanket 344. As shown in FIG. 15, the mass strips 384 may be respectively located along the diagonal notches 376 (FIG. 15) on the opposing lateral sides of the forming mandrel 202 to provide additional pressure for forcing the composite charge 500 into the diagonal notches 376. The mass strips 384 may be attached to the upper heating blanket 344 with locally placed Velcro™ strips, zip ties, or other mechanical attachment means, or the mass strips 384 may be sandwiched between the upper blanket layer 356 and lower blanket layer 358 of the upper heating blanket 344. In a non-limiting example, each mass strip may be provided as an elongate, high-density element or material such as metallic rod optionally covered with protective and/or resiliently deformable material such as plastic, rubber, fabric, or any other soft material to prevent damage to the fabric of the upper heating blanket 344. The mass strips 384 and the mass layer 382 may be used alone or in combination with each other.

Referring to FIG. 15, the forming system 200 may include the forming device 430 configured to be positioned over the blanket aft extension 374 located aft of the tapered sections 406. As mentioned above, the forming device 430 applies forming device pressure 432 uniformly to the composite charge 500 against the cross-sectional profile of the forming mandrel 202 to conform the heated composite charge 500 to the contour of the forming mandrel 202. In addition, a resiliently compressible forming device 430 may better accommodate slight variations in the cross-sectional shape of the forming mandrel 202 along the lengthwise direction of the forming mandrel 202. In the embodiment shown, the forming device 430 is provided as a rollable element 434. As shown in FIG. 9, the forming device 430 may be supported and translated by an end effector 334 of a robotic device 332 (FIG. 9) engaged to an axle 436 of the rollable element 434.

As mentioned above and shown in FIGS. 30-31, the rollable element 434 may initially be rolled into position onto the blanket aft extension 374, after which the rollable element 434 remains static (i.e., is non-rolling) relative to the blanket assembly 340 during slidable translation of the blanket assembly 340 along the forming mandrel 202 while the composite charge 500 is held stationary on the forming mandrel 202. In some examples, the rollable element 434 may be a pneumatic device such as inflatable element. The rollable element 434 may be hollow and may be filled with pressurized gas or air. Optionally, the rollable element 434 may be filled with mass particulates such as lead shot, magnetic particles, or other materials for improving the ability of the forming device 430 to compact the composite charge 500 against the forming mandrel 202 and thereby reduce or prevent the occurrence of wrinkles. Although shown as a rollable element 434, the forming device 430 may be a non-rolling element (not shown) positionable on the blanket aft extension 374.

Referring to FIG. 17, shown is a side view of the forming system 200 with the forming device 430 omitted for clarity. FIG. 17 illustrates the blanket assembly 340 and the composite charge 500 mounted on the forming mandrel 202 and the transition of the composite charge 500 from the approximately flat configuration 312 at the forward sections 422 of the wedge elements 400 to the angled configuration 314 aft of the tapered sections 406. As described in greater detail below, the blanket assembly 340 is configured to heat the composite charge 500 to reduce the resin viscosity and thereby reduce interlaminar friction or adhesion between the composite plies 504 to facilitate interlaminar slippage of the composite plies 504 as described below.

FIG. 18 is a sectional view of the forming system 200 showing the composite charge 500 supported on the forming mandrel 202 by the forward sections 422 of the pair of wedge elements 400. The composite charge 500 initially has an approximately flat configuration 312. The forming mandrel 202 has a level tangent 208 to the forming mandrel 202 apex 206 (e.g., radius) interconnecting the mandrel side surfaces 212. In the example shown, the level tangent 208 is oriented horizontally.

FIG. 19 is a magnified view of one lateral side of the composite charge 500 of FIG. 18 in the initially approximately flat configuration 312. The blanket assembly 340 including the wedge elements 400 are omitted for clarity. The composite charge 500 is comprised of a plurality of composite plies 504. Also shown in FIG. 19 are a series of vertical phantom lines that are equally spaced apart from one another.

FIG. 20 is a sectional view of the forming system 200 showing the initial formation of a Z-shaped contour 510 in each of laterally opposite sides of the composite charge 500. Opposite sides of the composite charge 500 are each formed into a Z-shaped contour 510 as a result of the blanket forming pressure 378 applied on the composite charge 500 by the upper heating blanket 344 and optional mass element 380.

FIG. 21 is a magnified view of one lateral side of the composite charge 500 of FIG. 20 showing a Z-shaped contour 510. The blanket assembly 340 and wedge elements 400 are omitted for clarity. The blanket forming pressure 378 causes the composite plies 504 to interlaminarly slip relative to one another within the slipping zone 512. Within the slipping zone 512, the formerly vertical (FIG. 19) phantom lines within are now non-vertical. The laterally outboard portion 520 of the composite charge 500 is a non-slipping zone 518 in which the composite plies 504 are stationary or non-slipping relative to one another, as indicated by the vertical phantom lines. Advantageously, the wedge element top side 402 supports the laterally outboard portion 520 of the composite charge 500 in approximately parallel relation to the level tangent 208 to the apex 206 of the forming mandrel 202, which avoids the need for interlaminar slippage between the composite plies 504 within the laterally outboard portion 520, and thereby maintains the non-slipping zone 518 in a relatively narrow width.

FIG. 22 is a sectional view of the forming system 200 of FIG. 17 showing a further pronounced Z-shaped contour 510 in each side of the composite charge 500. In this regard, the Z-shaped contour 510 gets progressively deeper as the composite charge 500 moves over the tapered section 406 of the wedge elements 400 during translation of the blanket assembly 340 along the forming mandrel 202.

FIG. 23 is a magnified view of one lateral side of the composite charge 500 of FIG. 22 (blanket assembly omitted for clarity) showing the relatively small laterally-outwardly-moving slipping zone 512 located at the juncture of the mandrel side surface 212 with the wedge element top side 402. By maintaining the laterally outboard portion 520 of the composite charge 500 in approximately parallel relation (e.g., approximately horizontal) to the level tangent 208 to the apex 206 of the forming mandrel 202, the non-slipping zone 518 is maintained at a relatively narrow width. A non-slipping zone 518 occurs in the composite charge 500 on each side of the slipping zone 512.

Figure 24:
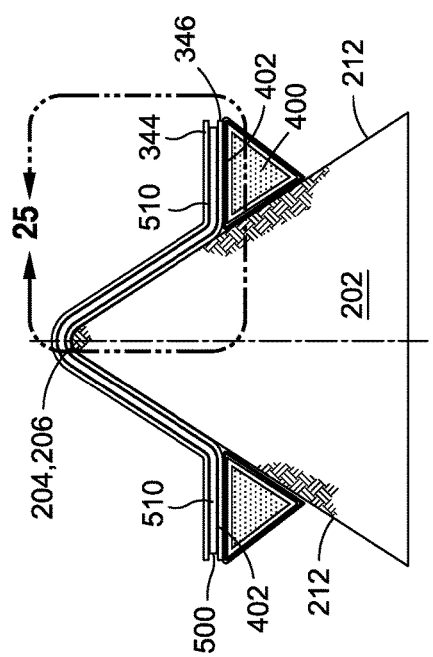
FIG. 24 is a sectional view of the forming system taken along line 24 of FIG. 17 and illustrating a further pronounced Z-shaped contour in each side of the composite charge as the composite charge moves over the tapered section of the wedge elements during translation of the blanket assembly along the forming mandrel.

FIG. 24 is a sectional view of the forming system 200 of FIG. 17 showing the Z-shaped contour 510 in each side of the composite charge 500 at a larger depth than in FIG. 22. In this regard, the slipping zone 512 on each of the lateral sides of the forming mandrel 202 moves laterally outwardly as the weight of the upper heating blanket 344 incrementally conforms the composite charge 500 to the cross-sectional shape of the forming mandrel 202 during translation of the blanket assembly 340 along the forming mandrel 202.

FIG. 25 is a magnified sectional view of the composite charge 500 of FIG. 24 (blanket assembly omitted for clarity) showing the laterally-outwardly-moving slipping zone 512 and the non-slipping zones 518 on opposite sides of each slipping zone 512. As mentioned above, the wedge element top side 402 maintains the laterally outboard portion 520 of the composite charge 500 in approximately (e.g., within 30 degrees and, more preferably, within 10 degrees) parallel relation to the level tangent 208 which, in the example shown, is a horizontal orientation.

Figure 26:
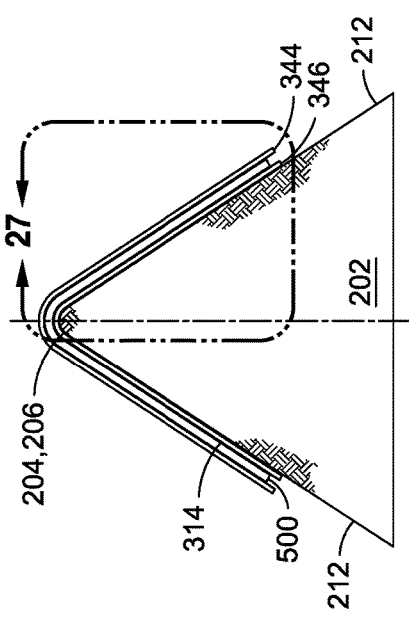
FIG. 26 is a sectional view of the forming system taken along line 26 of FIG. 17 and illustrating each side of the composite charge conformed to the forming mandrel at a location aft of the tapered section of the wedge elements.

FIG. 26 is a sectional view of the forming system 200 of FIG. 17 showing each side of the composite charge 500 generally conformed to the forming mandrel 202 at a location upstream of the wedge elements 400. The forming device 430 (FIG. 10) is omitted for clarity. As indicated above, the forming device 430 is located upstream of the wedge elements 400. The forming device 430 applies forming device pressure 432 (e.g., FIGS. 31-33) uniformly to the composite charge 500 for forming the composite charge 500 to the cross-sectional shape of the forming mandrel 202.

Figure 27:
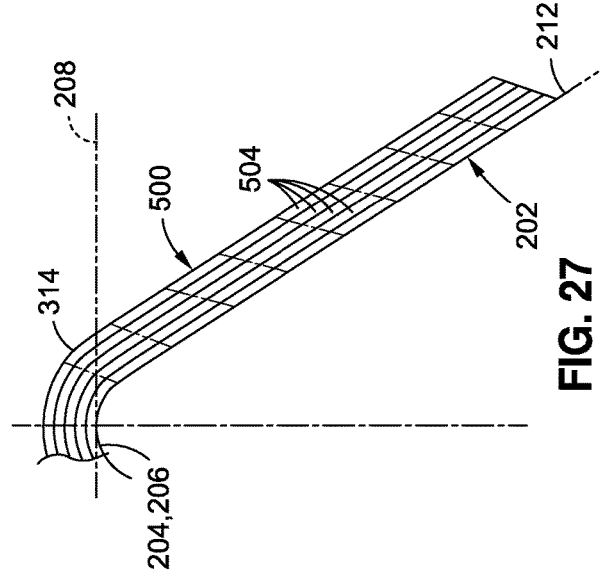
FIG. 27 is a magnified sectional view of the composite charge taken along line 27 of FIG. 26 and illustrating the composite charge conformed to the mandrel side surface of the forming mandrel.

FIG. 27 is a magnified sectional view of the composite charge 500 of FIG. 26 showing the composite charge 500 conformed to the mandrel side surface 212 of the forming mandrel 202. The blanket assembly 340 and forming device 430 are omitted for clarity. The sequence of illustrations in FIGS. 20-27 show the forming of the composite charge 500 to the forming mandrel 202 without wrinkles, creases, and/or buckles along the inside corners (e.g., at the apex 206) of the composite charge 500 that would otherwise occur if the composite charge 500 were formed by folding the entire length of the opposing lateral sides of the composite charge 500 over the forming mandrel 202 all at one time.

Referring now to FIG. 28 with additional reference to FIGS. 29-34, shown is a flowchart having one or more operations included in a method 600 of forming a composite charge 500 onto a forming mandrel 202. Step 602 of the method 600 includes positioning the composite charge 500 between the upper heating blanket 344 and the lower heating blanket 346 of the blanket assembly 340. FIG. 30 illustrates the blanket assembly 340 and the composite charge 500 mounted on the forming mandrel 202. As described above, the lower heating blanket 346 has a pair of wedge elements 400 located respectively between the opposing mandrel sides and the underside of the lower heating blanket 346. Each wedge element 400 includes a tapered section 406 having wedge element top sides 402 that are downwardly inclined along the upstream direction from the tapered section forward end 408 to the tapered section aft end 410. The downward inclination of the tapered sections is relative to the mandrel top portion 204.

Step 602 includes mounting the lower heating blanket 346 on the forming mandrel 202, and positioning the pair of wedge elements 400 respectively between the opposing mandrel side surfaces 212 and the underside of the lower heating blanket 346. The wedge elements 400 each have a wedge element inner side 404 (FIG. 13) that bears against a mandrel side surface 212. As shown in FIG. 8, the wedge element top side 402 of each wedge element 400 supports the composite charge 500 and the blanket assembly 340. Step 602 may additionally include positioning the composite charge 500 over the lower heating blanket 346 such that opposing ends of the composite charge 500 respectively extend at least to the mandrel upstream end 214 and the mandrel downstream end 216 of the forming mandrel 202. Step 602 may also include securing the charge upstream end 506 of the composite charge 500 to the mandrel upstream end 214 such as by using an upstream hinge clamp 302 as shown in FIG. 9. Prior to forming over the forming mandrel 202, the composite charge 500 may have an initially approximately flat configuration 312.

Step 602 may additionally include securing the charge downstream end 508 of the composite charge 500 to a charge tensioning mechanism 440. As described above and illustrated in FIG. 9, the charge tensioning mechanism 440 may be a robotic device 332 having an end effector 334 configured to apply lengthwise tension 442 to the composite charge 500 during the forming of the composite charge 500 to the forming mandrel 202. Alternatively, the charge tensioning mechanism 440 may be configured as a spring (not shown), an actuator (not shown), or other device fixedly mounted relative to the mandrel downstream end 216. Step 602 may further include positioning the upper heating blanket 344 over the composite charge 500 such that the blanket forward end 350 of the upper heating blanket 344 is approximately aligned with the blanket forward end 350 of the lower heating blanket 346.

Step 604 of the method 600 includes heating (FIGS. 29-32) the composite charge 500 using the heating elements 386 (FIG. 5) of the upper heating blanket 344 and/or the lower heating blanket 346 to reduce the viscosity of resin in the composite charge 500 prior to and/or during the forming of the composite charge 500 onto the forming mandrel 202. As described above, the wedge elements 400 may each include a forward section 422 located forward of the tapered section forward end 408. The heating elements 386 of the upper heating blanket 344 and the lower heating blanket 346 may extend over the tapered sections 406 and over the forward sections 422 of the wedge elements 400. The wedge element top sides 402 of the forward sections 422 may be approximately flush (e.g., within approximately 13 mm) with the mandrel top portion 204 when the blanket assembly 340 is mounted on the forming mandrel 202. For a blanket assembly 340 having wedge elements 400 that include forward sections 422, the step of heating the composite charge 500 may include heating the composite charge 500 using the upper heating blanket 344 and/or the lower heating blanket 346 extending into the forward section 422. In addition, the composite charge 500 may be heated by the upper heating blanket 344 and/or the lower heating blanket 346 when the composite charge 500 passing over the tapered sections 406.

Regarding heating of the composite charge 500, the method 600 may include regulating, using the controller 398 (FIG. 5), the heat 392 output of the heating blankets 344, 346 based upon temperature data received from thermocouples 394 that may be incorporated into the upper heating blanket 344 and the lower heating blanket 346. The controller 398 may regulate the temperature of the upper heating blanket 344 and/or lower heating blanket 346 in a manner to maintain the composite charge 500 within a predetermined temperature range during forming of the composite charge 500. For example, the controller 398 may limit temperature of the composite charge 500 below that which undesirably advances the cure of the resin, or which overheats the protective layer 354 (e.g., FEP film) that may be applied over the upper and lower surfaces of the composite charge 500. In addition, the controller 398 may maintain the composite charge 500 above a temperature that sufficiently reduces the viscosity of the resin to allow interlaminar slippage of the adjacent composite plies 504 within the slipping zone 512 when forming the composite charge 500 against the mandrel side surfaces 212 and the wedge element top sides 402.

Step 606 of the method 600 includes translating the blanket assembly 340 along the lengthwise direction of the forming mandrel 202 with the composite charge 500 sliding therethrough from the blanket forward end 350 to the blanket aft end 352. The step of translating the blanket assembly 340 may include engaging the rigid elements 366 that may be respectively coupled to or included with the upper heating blanket 344 and the lower heating blanket 346 as shown in FIG. 9. For example, an end effector 334 of a robotic device 332 may engage the rigid elements 366 for pulling the blanket assembly 340 toward the mandrel downstream end 216. As mentioned above, the rigid elements 366 may provide a structurally rigid location at which the blanket assembly 340 may be pulled by a translating mechanism 330 such as a robotic device 332, an overhead gantry, or other translating mechanism 330.

As shown in FIGS. 5, 7-10, and 15, the upper heating blanket 344 and the lower heating blanket 346 may each include a blanket aft extension 374. The blanket aft extension 374 may extend aftwardly of the tapered section aft end 410. In such an arrangement, the method may include positioning a forming device 430 onto the blanket aft extension 374. For example, the forming device 430 may be held engaged by a robotic device 332 as shown in FIG. 9. In FIG. 29, the forming device 430 is a rollable element 434 which may be initially lowered onto the blanket assembly 340 at the location of the tapered section forward ends 408. FIG. 30 illustrates the rollable element 434 being rolled along an upstream direction over the portion of the blanket assembly 340 and composite charge 500 covering the tapered sections 406. The rollable element 434 may be rolled onto the blanket aft extension 374 to generally conform the composite charge 500 into the Z-shaped contours 510 (e.g., FIGS. 20-25), after which the rollable element 434 is held stationary (e.g., by a first robotic device 332—FIG. 9) on the blanket assembly 340 while the blanket assembly 340 and rollable element 434 are translated as a unit by the first robotic device and second robotic device 332 (e.g., FIG. 9) along the forming mandrel 202.

The method 600 may include applying, using the forming device 430, forming device pressure 432 onto the composite charge 500 against the mandrel side surfaces 212. In this regard, the first robotic device 332 may be engaged to the axle 436 of the rollable element 434. The first robotic device 332 may be configured to apply downward forming device pressure 432 onto the blanket assembly 340 while the first robotic device 332 and the second robotic device 332 cooperate to translate the blanket assembly 340 and forming device 430 as a unit along a downstream direction of the forming mandrel 202. During translation of the blanket assembly 340 and forming device 430, the method 600 may include urging the rigid elements 366 of the upper heating blanket 344 and the lower heating blanket 346 toward each other to generate the above-described blanket entrance clamping pressure 372 on the composite charge 500. The step of urging the rigid elements 366 toward each other may include using spring mechanisms 368 such as the above-described clamping springs 370 included with the rigid elements 366 to urge the rigid elements 366 toward each other for generating the blanket entrance clamping pressure 372 on the composite charge 500.

With the blanket entrance clamping pressure 372 applied to the composite charge 500, the method 600 may include inducing lengthwise tension 442 in the composite charge 500 between the blanket forward end 350 and the forming device 430 when the blanket assembly 340 is translated along the forming mandrel 202. As mentioned above, the blanket assembly 340 may be translated along the forming mandrel 202 by a translating mechanism 330 such as a robotic device 332 (FIG. 9) pushing and/or pulling the rigid elements 366 toward the mandrel downstream end 216 as shown in FIGS. 31-33. The pulling of the blanket assembly 340 results in lengthwise tension 442 in the portion of the composite charge 500 between the blanket entrance (e.g., where blanket entrance clamping pressure 372 is applied to the composite charge 500) and the location of the forming device 430 (e.g., where the forming device pressure 432 is applied to the composite charge 500). The lengthwise tension 442 prevents or reduces the formation of lengthwise wrinkles and/or creases (not shown) in the composite charge 500 that would otherwise occur due to the formation of the Z-shaped contour 510 in each of the laterally opposite sides of the composite charge 500 when the composite charge 500 is passed over the tapered section 406. As indicated above, the geometry of the tapered sections 406 may prevent the formation of lengthwise wrinkles in the composite charge 500. In an embodiment described above with reference to FIGS. 11-13, the tapered section length 412 may be at least 2 times the tapered section depth 420 to provide a sufficient length of the composite charge material to allow the lengthwise tension 442 to absorb or accommodate excess composite charge material within the diagonal notches 376 on opposite sides of the forming mandrel 202, thereby reducing or preventing the occurrence of lengthwise wrinkles in the composite charge 500.

Step 608 of the method 600 includes exerting, using the upper heating blanket 344, a blanket forming pressure 378 on the composite charge 500 as the composite charge 500 passes over the tapered sections 406 during translation of the blanket assembly 340 along the forming mandrel 202 as shown in FIGS. 31-32. The step of exerting the blanket forming pressure 378 on the composite charge 500 may optionally include applying a mass element 380 on top of the upper heating blanket 344 to increase the amount of blanket forming pressure 378 applied by the upper heating blanket 344 to the composite charge 500. As shown in FIGS. 4, 7, and 16, the mass element 380 may be provided as a mass layer 382 which may be removably or permanently mountable on top of the upper heating blanket 344 and which may extend at least partially between the blanket forward end 350 and the blanket aft end 352. Alternatively or additionally, the mass element 380 may be provided as a pair of discrete mass strips 384 mounted to the upper heating blanket 344 and respectively located on opposing lateral sides of a blanket centerline 342 in approximate alignment with the diagonal notches 376.

Step 610 of the method 600 includes progressively forming the composite charge 500 into the cross-sectional shape collectively defined by the mandrel side surfaces 212 and the wedge element top sides 402. The composite charge 500 is progressively formed to the mandrel cross-sectional shape as the composite charge 500 passes over the tapered sections 406 of the wedge elements 400 during translation of the blanket assembly 340 and forming device 430 along the forming mandrel 202 as shown in FIG. 31-33. As indicated above, the progressive forming of the composite charge 500 onto the forming mandrel 202 is facilitated by the application of the blanket forming pressure 378 exerted by the upper heating blanket 344 and optional mass element 380 on the composite charge 500 during translation of the blanket assembly 340 and forming device 430.

Step 612 of the method 600 includes inducing in each of laterally opposite sides of the composite charge 500 a Z-shaped contour 510 having a laterally-outwardly-moving slipping zone 512 as shown in FIGS. 20-25 and described above. Each one of the slipping zones 512 is located proximate a diagonal notch 376 defined at the juncture of each mandrel side surface 212 with a wedge element top side 402, as shown in FIGS. 21, 23, and 25. Within the slipping zone 512 of each Z-shaped contour 510, the composite plies 504 of the composite charge 500 interlaminarly slip relative to one another, facilitated by reduced interlaminar friction or shear due to reduced resin viscosity in the composite charge 500 as a result of heating by the heating elements 386 of the upper heating blanket 344 and the lower heating blanket 346.

Step 614 of the method 600 includes supporting the laterally outboard portion 520 of the Z-shaped contour 510 on each laterally opposite side of the composite charge 500 in approximately parallel relation to a level tangent 208 to the mandrel top portion 204 during progressive forming of the composite charge 500 against the mandrel side surfaces 212 and wedge element top sides 402. In the example of FIGS. 20-25, the level tangent 208 is tangent to the radiused apex 206 of the forming mandrel 202. The laterally outboard portions 520 of the Z-shaped contour 510 are maintained in a horizontal orientation and which is parallel to the horizontal orientation of the level tangent 208. Advantageously, each one of the slipping zones 512 has a relatively narrow lateral width as a result of maintaining the laterally outboard portions 520 of the composite charge 500 in a horizontal orientation. As indicated above, the relatively narrow width of the slipping zones 512 reduces the magnitude of interlaminar shear between adjacent composite plies 504, thereby allowing the composite plies 504 to slip relative to one another within the slipping zones 512. The reduction in interlaminar shear between the composite plies 504 reduces the buildup of compressive forces in the composite plies 504 along inside corners such as along the apex 206 of the forming mandrel 202, and thereby prevents the occurrence of localized wrinkling or buckling of the composite plies 504 which would otherwise reduce the strength and/or stiffness of the cured composite structure 102.

Referring briefly to FIGS. 31-33, the method 600 may additionally include conforming the composite charge 500 to the cross-sectional shape of the forming mandrel 202 using the forming device 430 which may be supported on the blanket aft extension 374. As indicated above, the forming device 430 may apply forming device pressure 432 to confirm the composite charge 500 into the cross-sectional shape of the forming mandrel 202 downstream of the tapered sections 406 and may thereby reduce or prevent wrinkling of the composite charge 500. Referring to FIG. 10, in an optional embodiment, the forming system 200 may include a inverted V-shaped forming plate 438 supported on the blanket aft extension 374 and mounted aft of the forming device 430. The forming plate 438 may be pressured by a separate robotic device 332 or overhead gantry (not shown) for compacting the composite charge 500 against the cross-sectional shape of the forming mandrel 202.

FIG. 34 shows the removal of the blanket assembly 340 and the forming device 430 from the forming mandrel 202 after the blanket assembly 340 has been translated along the entire length of the forming mandrel 202. The composite charge 500 is shown conformed to the cross-sectional shape of the forming mandrel 202. The charge upstream end 506 and charge downstream end 508 may be unclamped from the upstream hinge clamp 302 and downstream hinge clamp 304 respectively located at the mandrel upstream end 214 and mandrel downstream end 216, and removed from the forming mandrel 202. The formed composite charge 500 may be assembled with another composite charge 500. For example, two L-shaped composite stringers may be assembled back-to-back to form an uncured T-shaped cross section stringer which may be cured and then co-bonded to another composite part such as a composite skin. Alternatively, the uncured T-shaped cross section stringer may be co-cured with a composite part such as a composite skin.

Many modifications and other configurations of the disclosure will come to mind to one skilled in the art, to which this disclosure pertains, having the benefit of the teachings presented in the foregoing descriptions and the associated drawings. The configurations described herein are meant to be illustrative and are not intended to be limiting or exhaustive. Although specific terms are employed herein, they are used in a generic and descriptive sense only and not for purposes of limitation.

What is claimed is:

1. A blanket assembly for glide forming a composite charge onto a forming mandrel, the forming mandrel having opposing mandrel side surfaces interconnected by a mandrel top portion, the blanket assembly comprising:
    an upper heating blanket and a lower heating blanket configured to have a composite charge slidable therebetween;
    a heating element included with at least one of the upper heating blanket and the lower heating blanket for heating the composite charge;
    a pair of wedge elements positionable between the lower heating blanket and the opposing mandrel side surfaces and each including a tapered section and having a wedge element top side configured to support the composite charge and the blanket assembly when mounted on the forming mandrel, the wedge element top sides being downwardly inclined from a tapered section forward end to a tapered section aft end, the wedge element top sides configured to be approximately parallel with each other and approximately parallel to a level tangent to an uppermost point of the mandrel top portion when the blanket assembly is viewed in transverse cross section; and
    the upper heating blanket configured to exert a blanket forming pressure onto the composite charge for progressively forming the composite charge and lower heating blanket against the mandrel side surfaces and the wedge element top sides in a manner to induce in each of laterally opposite sides of the composite charge a Z-shaped contour having a laterally-outwardly-moving slipping zone located along a juncture of each mandrel side surface with the wedge element top side, and within which composite plies of the composite charge interlaminarly slip relative to one another during translation of the blanket assembly along the forming mandrel.

2. The blanket assembly of claim 1 wherein further including:
    a rigid element coupled to a blanket forward end of each one of the upper heating blanket and the lower heating blanket; and
    the rigid element of the upper heating blanket and the lower heating blanket configured to be pulled along the forming mandrel for translating the blanket assembly.

3. The blanket assembly of claim 2 wherein:
    the upper heating blanket and the lower heating blanket each including a blanket aft extension extending aftwardly from the tapered section aft end;
    the blanket aft extension configured to receive a forming device configured to apply forming device pressure onto the composite charge against the mandrel side surfaces; and
    the rigid element of the upper heating blanket and the lower heating blanket configured to be urged toward each other and generate a blanket entrance clamping pressure on the composite charge for inducing lengthwise tension in the composite charge between the blanket forward end and the forming device when the blanket assembly is pulled by the rigid elements.

4. The blanket assembly of claim 1 wherein:
    each one of the wedge elements has a tapered section length and a tapered section depth, the tapered section length is at least 2 times the tapered section depth.

5. The blanket assembly of claim 1 wherein:
    the wedge elements are resiliently compressible and configured to conform to localized variations in a cross section of the forming mandrel as the blanket assembly is translated along the forming mandrel.

6. The blanket assembly of claim 1 further including:
    a mass element configured to be mountable on top of the upper heating blanket for increasing the blanket forming pressure.

7. The blanket assembly of claim 6 wherein the mass element is configured as at least one of:
    a mass layer mountable on top of the upper heating blanket and extending at least partially between a blanket forward end and a blanket aft end; and
    a pair of discrete mass strips mounted to the upper heating blanket and respectively located on opposing sides of a blanket centerline and in approximate alignment with a diagonal notch at a juncture of the wedge element top side of the wedge element and a mandrel side surface of the forming mandrel.

8. The blanket assembly of claim 1 wherein:
    the wedge elements each include a forward section located forward of a tapered section forward end and having a wedge element top side that is approximately flush with the mandrel top portion; and
    the at least one heating element extending over the forward section for heating the composite charge prior to the composite charge passing over the tapered section during translation of the blanket assembly along the forming mandrel.

9. The blanket assembly of claim 1 wherein at least one of the upper heating blanket and the lower heating blanket is comprised of:
an upper blanket layer;
a lower blanket layer; and
the heating element sandwiched between the upper blanket layer and the lower blanket layer.

10. A forming system for glide forming a composite charge onto a forming mandrel, comprising:
a forming mandrel having a mandrel upstream end, a mandrel downstream end, and opposing mandrel side surfaces interconnected by a mandrel top portion;
a blanket assembly including:
an upper heating blanket and a lower heating blanket configured to have a composite charge slidable therebetween during pulling of a blanket forward end of the upper heating blanket and the lower heating blanket along the forming mandrel from the mandrel upstream end to the mandrel downstream end;
a heating element included with at least one of the upper heating blanket and the lower heating blanket and configured to heat the composite charge;
a pair of wedge elements positionable against an underside of the lower heating blanket and each including a tapered section and having a wedge element inner side configured to bear against the opposing mandrel side surfaces, and a wedge element top side configured to support the composite charge and the blanket assembly when mounted on the forming mandrel, the wedge element top sides being downwardly inclined relative to the mandrel top portion from a forward end to an aft end of the tapered section, the wedge element top sides configured to be approximately parallel with each other and approximately parallel to a level tangent to an uppermost point of the mandrel top portion when the blanket assembly is viewed in transverse cross section; and
the upper heating blanket configured to exert a blanket forming pressure onto the composite charge for progressively forming the composite charge and lower heating blanket against the mandrel side surfaces and wedge element top sides in a manner to induce in each of laterally opposite sides of the composite charge a Z-shaped contour having a laterally-outwardly-moving slipping zone located along a juncture of each mandrel side surface with the wedge element top side, and within which composite plies of the composite charge interlaminarly slip relative to one another during translation of the blanket assembly along the forming mandrel.

11. The forming system of claim 10 wherein the blanket assembly further includes:
a rigid element coupled to a blanket forward end of each one of the upper heating blanket and the lower heating blanket, and configured to be pulled along the forming mandrel for translating the blanket assembly;
the upper heating blanket and the lower heating blanket each including a blanket aft extension extending aftwardly from the tapered section aft end and configured to receive a forming device configured to apply a forming device pressure onto the composite charge against the mandrel side surfaces; and
the rigid element of the upper heating blanket and the lower heating blanket configured to be urged toward each other and generate a blanket entrance clamping pressure on the composite charge for inducing lengthwise tension in the composite charge between the blanket forward end and a location of the forming device pressure when the blanket assembly is pulled by the rigid elements.

12. The forming system of claim 10 wherein:
each one of the wedge elements has a tapered section length and a tapered section depth, the tapered section length is at least 2 times the tapered section depth.

13. The forming system of claim 10 wherein the blanket assembly further includes:
a mass element configured to be mountable on top of the upper heating blanket for increasing the blanket forming pressure exerted by the upper heating blanket.

14. The forming system of claim 10 wherein:
the wedge elements each include a forward section located forward of a tapered section forward end and having a wedge element top side that is approximately flush with the mandrel top portion; and
the at least one heating element extending over the forward section for heating the composite charge prior to the composite charge passing over the tapered section during translation of the blanket assembly along the forming mandrel.

15. A method of forming a composite charge onto a forming mandrel, comprising:
positioning a composite charge between an upper heating blanket and a lower heating blanket mounted on a forming mandrel having opposing mandrel side surfaces interconnected by a mandrel top portion, the lower heating blanket having a pair of wedge elements respectively between the opposing mandrel sides and an underside of the lower heating blanket, each wedge element including a tapered section having wedge element top sides downwardly inclined from a forward end to an aft end of the tapered section, the upper heating blanket, lower heating blanket, and the wedge elements collectively forming a blanket assembly, the wedge element top sides configured to be approximately parallel with each other and approximately parallel to a level tangent to an uppermost point of the mandrel top portion when the blanket assembly is viewed in transverse cross section;
heating the composite charge using at least one of the upper heating blanket and the lower heating blanket to reduce a viscosity of resin in the composite charge;
translating the blanket assembly along a lengthwise direction of the forming mandrel with the composite charge sliding therebetween;
exerting, using the upper heating blanket, a blanket forming pressure on the composite charge passing over the tapered sections;
progressively forming the composite charge against the mandrel side surfaces and wedge element top sides in response to the blanket forming pressure;
inducing in each of laterally opposite sides of the composite charge a Z-shaped contour having a laterally-outwardly-moving slipping zone located along a juncture of each mandrel side surface with a wedge element top side, and within which composite plies of the composite charge interlaminarly slip relative to one another; and
supporting a laterally outboard portion of the Z-shaped contour on each laterally opposite side of the composite charge in approximately parallel relation to the level tangent to the uppermost point of the mandrel top portion during forming of the composite charge against the mandrel side surfaces and wedge element top sides.

16. The method of claim 15 wherein the step of translating the blanket assembly along the forming mandrel includes:
pulling a pair of rigid elements respectively coupled to the upper heating blanket and the lower heating blanket at a blanket forward end.

17. The method of claim 16 wherein the upper heating blanket and the lower heating blanket each include a blanket aft extension extending aftwardly from the tapered section aft end, the method further including:
applying, using a forming device positioned on the blanket aft extension, a forming device pressure onto the composite charge against the mandrel side surfaces;
urging the rigid element of the upper heating blanket and the lower heating blanket toward each other and generating a blanket entrance clamping pressure on the composite charge; and
inducing lengthwise tension in the composite charge between the blanket forward end and a location of the forming device pressure when the blanket assembly is pulled by the rigid elements.

18. The method of claim 15 wherein the wedge elements are resiliently compressible, the method further including:
conforming the wedge elements to localized variations in a cross section of the forming mandrel during translation of the blanket assembly along the lengthwise direction of the forming mandrel.

19. The method of claim 15 wherein the step of exerting the blanket forming pressure on the composite charge passing over the tapered sections comprises:
exerting, using the upper heating blanket in combination with a mass element mounted on top of the upper heating blanket, the blanket forming pressure on the composite charge.

20. The method of claim 15 wherein the wedge elements each include a forward section located forward of a tapered section forward end and having a wedge element top side that is approximately flush with the mandrel top portion, the step of heating the composite charge comprising:
heating, using at least one of the upper heating blanket and the lower heating blanket extending into the forward section, the composite charge prior to the composite charge passing over the tapered section.

21. A blanket assembly for glide forming a composite charge onto a forming mandrel, the forming mandrel having opposing mandrel side surfaces interconnected by a mandrel top portion, the blanket assembly comprising:
an upper heating blanket and a lower heating blanket configured to have a composite charge slidable therebetween;
a heating element included with at least one of the upper heating blanket and the lower heating blanket for heating the composite charge;
a pair of wedge elements positionable between the lower heating blanket and the opposing mandrel side surfaces and each including a tapered section and having a wedge element top side configured to support the composite charge and the blanket assembly when mounted on the forming mandrel, the wedge element top sides being downwardly inclined from a tapered section forward end to a tapered section aft end;
a rigid element coupled to a blanket forward end of each one of the upper heating blanket and the lower heating blanket;
the rigid element of the upper heating blanket and the lower heating blanket configured to be pulled along the forming mandrel for translating the blanket assembly;
the upper heating blanket and the lower heating blanket each including a blanket aft extension extending aftwardly from the tapered section aft end, the blanket aft extension configured to receive a forming device configured to apply forming device pressure onto the composite charge against the mandrel side surfaces;
the rigid element of the upper heating blanket and the lower heating blanket configured to be urged toward each other and generate a blanket entrance clamping pressure on the composite charge for inducing lengthwise tension in the composite charge between the blanket forward end and the forming device when the blanket assembly is pulled by the rigid elements; and
the upper heating blanket configured to exert a blanket forming pressure onto the composite charge for progressively forming the composite charge and lower heating blanket against the mandrel side surfaces and the wedge element top sides during translation of the blanket assembly along the forming mandrel.

22. A blanket assembly for glide forming a composite charge onto a forming mandrel, the forming mandrel having opposing mandrel side surfaces interconnected by a mandrel top portion, the blanket assembly comprising:
an upper heating blanket and a lower heating blanket configured to have a composite charge slidable therebetween;
a heating element included with at least one of the upper heating blanket and the lower heating blanket for heating the composite charge;
a pair of wedge elements positionable between the lower heating blanket and the opposing mandrel side surfaces and each including a tapered section and having a wedge element top side configured to support the composite charge and the blanket assembly when mounted on the forming mandrel, the wedge element top sides being downwardly inclined from a tapered section forward end to a tapered section aft end;
the upper heating blanket configured to exert a blanket forming pressure onto the composite charge for progressively forming the composite charge and lower heating blanket against the mandrel side surfaces and the wedge element top sides during translation of the blanket assembly along the forming mandrel; and
the wedge elements being resiliently compressible and configured to conform to localized variations in a cross section of the forming mandrel as the blanket assembly is translated along the forming mandrel.

23. A forming system for glide forming a composite charge onto a forming mandrel, comprising:
a forming mandrel having a mandrel upstream end, a mandrel downstream end, and opposing mandrel side surfaces interconnected by a mandrel top portion;
a blanket assembly including:
an upper heating blanket and a lower heating blanket configured to have a composite charge slidable therebetween during pulling of a blanket forward end of the upper heating blanket and the lower heating blanket along the forming mandrel from the mandrel upstream end to the mandrel downstream end;
a heating element included with at least one of the upper heating blanket and the lower heating blanket and configured to heat the composite charge;
a pair of wedge elements positionable against an underside of the lower heating blanket and each including a tapered section and having a wedge element inner side configured to bear against the opposing mandrel side surfaces, and a wedge element top side configured to support the composite charge and the blanket assembly when mounted on the forming mandrel, the wedge element top sides being downwardly inclined relative to the mandrel top portion from a forward end to an aft end of the tapered section;

a rigid element coupled to the blanket forward end of each one of the upper heating blanket and the lower heating blanket, and configured to be pulled along the forming mandrel for translating the blanket assembly;

the upper heating blanket and the lower heating blanket each including a blanket aft extension extending aftwardly from the tapered section aft end and configured to receive a forming device configured to apply a forming device pressure onto the composite charge against the mandrel side surfaces;

the rigid element of the upper heating blanket and the lower heating blanket configured to be urged toward each other and generate a blanket entrance clamping pressure on the composite charge for inducing lengthwise tension in the composite charge between the blanket forward end and a location of the forming device pressure when the blanket assembly is pulled by the rigid elements; and the upper heating blanket configured to exert a blanket forming pressure onto the composite charge for progressively forming the composite charge and lower heating blanket against the mandrel side surfaces and wedge element top sides during translation of the blanket assembly along the forming mandrel.

* * * * *